(12) United States Patent  
Kawaguchi et al.

(10) Patent No.: US 11,145,093 B2  
(45) Date of Patent: Oct. 12, 2021

(54) SEMICONDUCTOR DEVICE, IMAGE PROCESSING SYSTEM, IMAGE PROCESSING METHOD AND COMPUTER READABLE STORAGE MEDIUM

(71) Applicant: RENESAS ELECTRONICS CORPORATION, Tokyo (JP)

(72) Inventors: Hirofumi Kawaguchi, Tokyo (JP); Akihide Takahashi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 54 days.

(21) Appl. No.: 16/672,007

(22) Filed: Nov. 1, 2019

(65) Prior Publication Data

US 2020/0202581 A1 Jun. 25, 2020

(30) Foreign Application Priority Data

Dec. 21, 2018 (JP) .............................. JP2018-239560

(51) Int. Cl.
- *G06T 11/00* (2006.01)
- *G06T 3/20* (2006.01)
- *G06T 7/90* (2017.01)

(52) U.S. Cl.
CPC .............. *G06T 11/001* (2013.01); *G06T 3/20* (2013.01); *G06T 7/90* (2017.01); *G06T 2207/30252* (2013.01)

(58) Field of Classification Search
CPC . G06T 11/001; G06T 3/20; G06T 7/90; G06T 2207/30252; G06T 3/4038; G06T 2207/20021; G06T 2207/10024; G06T 7/30; H04N 9/73; H04N 9/735
See application file for complete search history.

(56) References Cited

U.S. PATENT DOCUMENTS

2014/0078247 A1* 3/2014 Shohara ................. H04N 9/735  
348/38

FOREIGN PATENT DOCUMENTS

JP 2008-079248 A 4/2008

* cited by examiner

*Primary Examiner* — Christopher Wait  
(74) *Attorney, Agent, or Firm* — McDermott Will & Emery LLP

(57) ABSTRACT

A semiconductor device includes an image acquisition circuit which acquires a plurality of captured image data obtained by capturing a plurality of images, an estimation source image generation circuit which cancels effects of initial color adjustment processing on each captured image data to generate image data of a plurality of estimation source images, a readjustment circuit which divides each estimation source image into a plurality of processing regions to perform color balance readjustment processing for each processing region, and an image synthesis circuit which synthesizes the image data of the plurality of estimation source images so that overlapping regions included in the estimation source images overlap each other to generate image data of a synthesized image.

20 Claims, 16 Drawing Sheets

SEMICONDUCTOR DEVICE, IMAGE PROCESSING SYSTEM, IMAGE PROCESSING METHOD AND COMPUTER READABLE STORAGE MEDIUM

CROSS-REFERENCE TO RELATED APPLICATIONS

The disclosure of Japanese Patent Application No. 2018-239560 filed on Dec. 21, 2018 including the specification, drawings and abstract is incorporated herein by reference in its entirety.

BACKGROUND

The present disclosure relates to a semiconductor device, an image processing method, and a computer readable storage medium.

Image processing techniques for simultaneously capturing images of a single scene by a plurality of cameras and displaying the captured images by performing synthesis or geometric transformation have become widespread. In automobiles, a system that allows a driver to easily recognize the periphery of an automobile by using such a technique is becoming widespread. An example of such an image processing technique is a surround view system. The surround view system displays, for example, a surround view that is a two-dimensional image of a 360-degree scenery around an automobile operated by a driver as seen from directly above. Viewing the surround view allows the driver to intuitively recognize objects present around the automobile. Therefore, the surround view system is rapidly spreading as a technology contributing to improving safety of automobiles.

Incidentally, in the case where a plurality of cameras simultaneously captures images of a surrounding scene, a color of illumination may be different for each image capturing region of the image captured by the camera. Further, each camera has a function of performing color balance processing on the captured image. That is, each camera may process the captured image using color balance different from that of another camera. Therefore, when the images captured by the plurality of cameras are synthesized, there is a demand for a technique for synthesizing the plurality of images subjected to different color balance processing without a sense of discomfort.

For example, a synthesis video display device in Japanese unexamined Patent Application publication No. 2008-079248 calculates a first statistical value and a second statistical value by taking statistics of pixel values of photographed pixels overlapping in the synthesized video, and calculates a target gain obtained by dividing an average value of the first statistical value and the second statistical value by the first statistical value. Then, the synthesis video display device changes, from 1 to the target gain, an adjustment gain used for image adjustment processing performed from a photographed pixel corresponding to an optical axis of a photographing device that has photographed a video which is a target of image adjustment to the overlapping photographed pixel.

SUMMARY

However, in the art described in Japanese unexamined Patent Application publication No. 2008-079248, color balance processing is performed on the basis of the photographed pixel corresponding to the optical axis of the photographing device. For this reason, the art described in Japanese unexamined Patent Application publication No. 2008-079248 may not perform appropriate color balance processing as a distance from the optical axis of the photographing device increases. For example, in the case of synthesizing an image obtained by photographing the front side of an automobile and an image obtained by photographing the left side of the automobile, there is a possibility that a region on the left front side of the automobile, which is an overlapped region, is irradiated with illumination with a color different from that of other regions. In such a case, the art described in Japanese unexamined Patent Application publication No. 2008-079248 cannot perform color balance processing suitable for the entire image.

Other objects and new features will be apparent from the description of this specification and the accompanying drawings.

A semiconductor device according to one embodiment includes an image acquisition circuit which acquires a plurality of captured image data obtained by capturing a plurality of images. Each captured image data is image data on which initial color adjustment processing has been performed, Each image includes an overlapping region in an image capturing region of the own image. The overlapping region is a region where the image capturing regions of the images overlap each other. The semiconductor device further includes an estimation source image generation circuit which cancels effects of the initial color adjustment processing on each captured image data to generate image data of a plurality of estimation source images, a readjustment circuit which divides each estimation source image into a plurality of processing regions to perform color balance readjustment processing for each processing region, and an image synthesis circuit which synthesizes the image data of the plurality of estimation source images so that the overlapping regions included in the estimation source images overlap each other to generate image data of a synthesized image.

A semiconductor device according to another embodiment is a semiconductor device for synthesizing first and second captured image data each including captured image data of an overlapping region. The first captured image data is data obtained by capturing an image of a first image capturing region. The second captured image data is data obtained by capturing an image of a second image capturing region. The overlapping region is a region where the first and second image capturing regions overlap each other. The semiconductor device includes an image data acquisition circuit which acquires the first and second captured image data on which initial color adjustment processing has been performed, an estimation source image generation circuit which cancels effects of the initial color adjustment processing performed on the first captured image data and the second captured image data to generate image data of a first estimation source image and image data of a second estimation source image, a readjustment circuit which divides each of the first estimation source image and the second estimation source image into a plurality of processing region and performs color balance readjustment processing on each of the image data of the first estimation source image and the image data of the second estimation source image for each processing region, and an image synthesis circuit which synthesizes the image data of the first estimation source image and the image data of the second estimation source image so that a region associated with the overlapping region included in the first estimation source image and a region associated with the overlapping region included in the second estimation source image overlap each other to generate image data of a synthesized image.

An image processing method according to yet another embodiment includes acquiring a plurality of captured image data obtained by capturing a plurality of images. Each captured image data is image data on which initial color adjustment processing has been performed. Each image includes an overlapping region in an image capturing region of the own image. The overlapping region is a region where the image capturing regions of the images overlap each other. The image processing method further includes canceling effects of the initial color adjustment processing on each captured image data to generate image data of a plurality of estimation source images, dividing each estimation source image into a plurality of processing region to perform color balance readjustment processing for each processing region, and synthesizing the image data of the plurality of estimation source images so that the overlapping regions included in the estimation source images overlap each other to generate image data of a synthesized image.

According to one embodiment, it is possible to provide a semiconductor device or the like for performing color balance processing suitable for an entire image.

DETAILED DESCRIPTION

Figure 1:
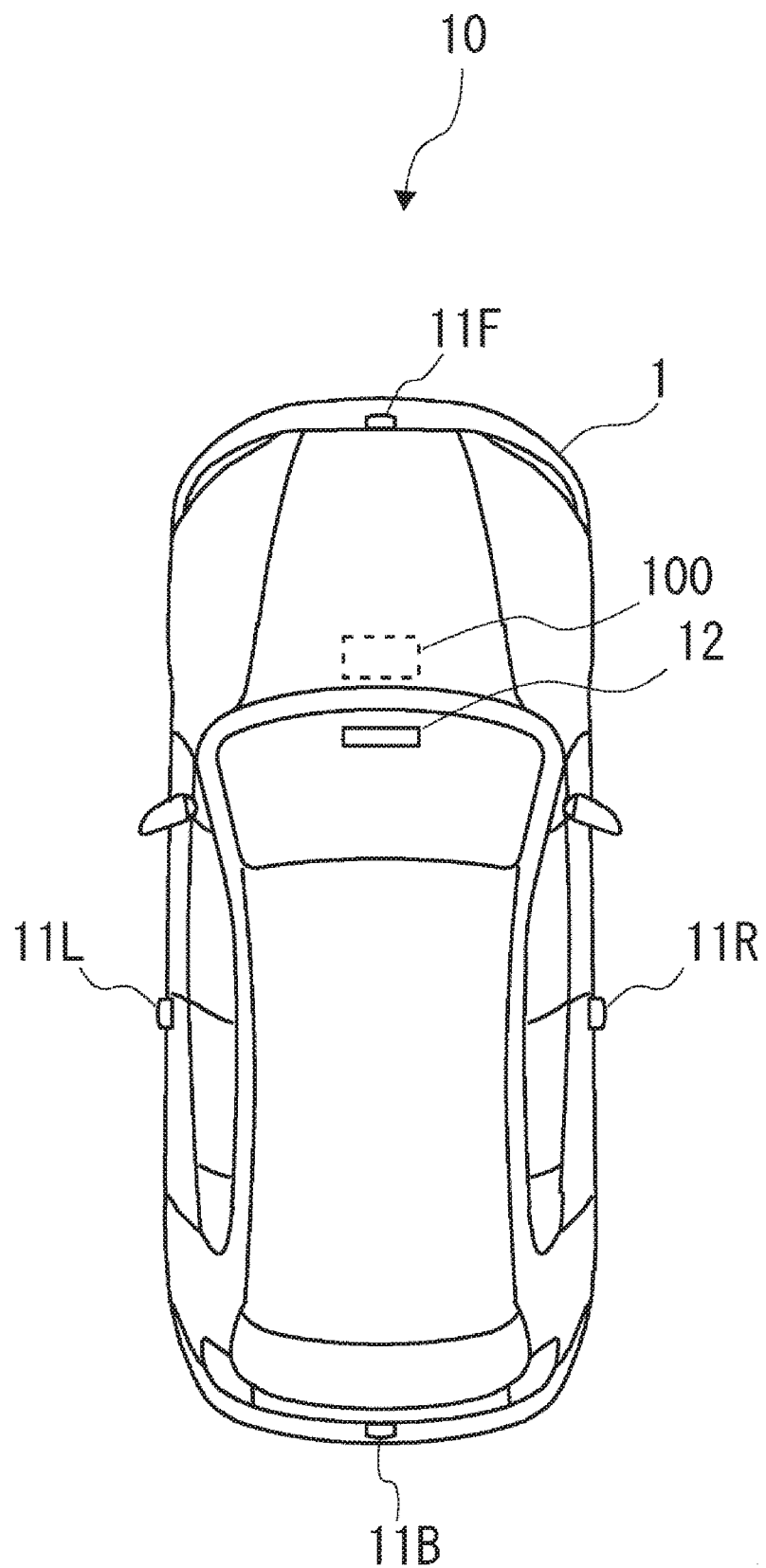
FIG. 1 is an overview of an automobile equipped with an image processing system according to a first embodiment.

For clarification of description, the following description and drawings are appropriately omitted and simplified. In addition, each of elements which are illustrated in the drawings as functional blocks for performing various types of processing is able to be configured by a Central Processing Unit (CPU), a memory, and other circuits in hardware is implemented by a program and so forth which is loaded into a memory and so forth in software. Accordingly, a person skilled in the art would understand that these functional blocks are able to be realized/implemented in various forms only by hardware, only by software or by a combination of the hardware and the software and are not limited to any one of them. Therefore, in the following description, a configuration illustrated as a circuit may be implemented by either the hardware or the software, or both, and a configuration shown as a circuit for implementing a certain function may also be shown as part of the software for implementing the similar function. For example, a configuration described as a control circuit may be described as a control unit. Incidentally, in the respective drawings, the same numerals are assigned to the same elements and duplicated description thereof is omitted as necessary.

First Embodiment

Figure 2:
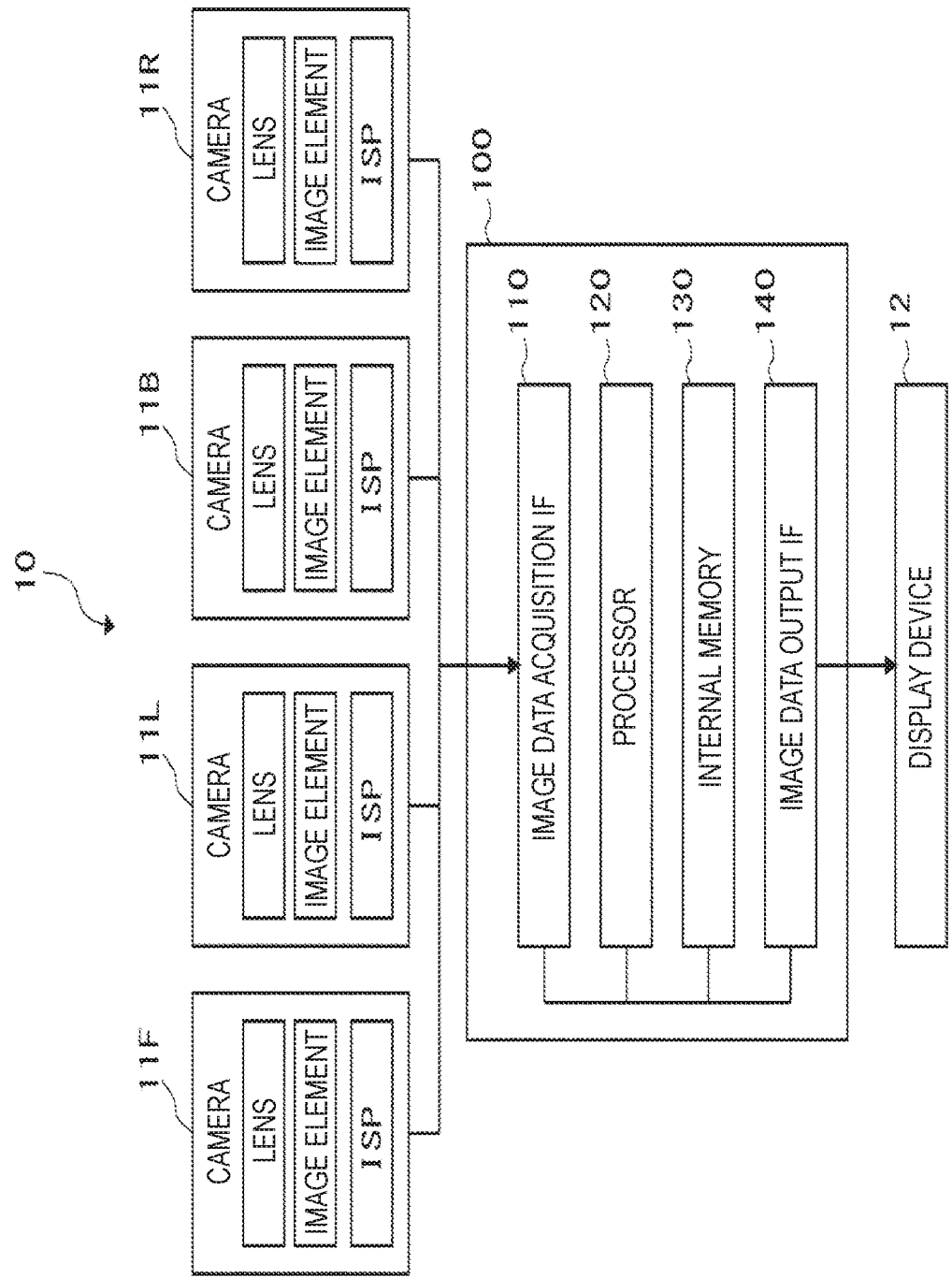
FIG. 2 is a schematic configuration diagram of the image processing system according to the first embodiment.

Referring to FIGS. 1 and 2, an outline of a configuration of a first embodiment will be described. FIG. 1 is an outline of an automobile equipped with an image processing system according to the first embodiment. The image processing system 10 is mounted on an automobile 1 shown in the drawing. The drawing is a top view of the automobile 1. The upper side of the drawing is the front side of the automobile 1. The left side of the drawing is the left side of the automobile 1. The lower side of the drawing is the rear side of the automobile 1. The right side of the drawing is the right side of the automobile 1.

FIG. 2 is a schematic configuration diagram of the image processing system according to the first embodiment. FIG. 2 schematically shows a main hardware configuration of the image processing system 10 mounted on the automobile 1. Hereinafter, each configuration of the image processing system 10 will be described with reference to FIGS. 1 and 2.

The image processing system 10 is a system for capturing an image of the periphery of the automobile 1, performing predetermined processing on the captured image data, and displaying the processed image to the driver or the like. The image processing system 10 includes a camera 11F, a camera 11L, a camera 11B, a camera 11R, a display device 12, and a semiconductor device 100 as main components of the image processing system 10.

The camera 11F, the camera 11L, the camera 113, and the camera 11R are imaging devices for capturing scenery around the automobile 1 respectively. Each of these four cameras includes lens, an image element for converting an image into an electric signal, an Image Signal Processor (ISP) for generating image data from the electric signal generated by the image element, and the like. The ISP is an image signal processing device for appropriately adjusting image quality for each pixel with respect to the electric signal generated by the image element. With such a configuration, each camera automatically adjusts color balance or the like in accordance with a preset algorithm, and outputs the adjusted image data. That is, objects photographed in an indoor special lighting environment or in sunset are difficult to identify. On the other hand, the ISP has a function of changing a signal level for each of R, G, and B of each pixel by executing the algorithm so that the object can be easily identified like an object photographed by natural light (white light).

Further, the four cameras process image data so as to conform to a predetermined file format. The predetermined file format is, for example, an Exchangeable image file format (Exif). The image data processed so as to conform to the Exif includes information such as captured date and time, a camera model, an aperture value, the number of pixels, and a color adjustment gain along with the captured image data. Color adjustment processing performed by the ISP is also referred to as initial color adjustment processing, Automatic White Balance (AWB) processing, or color balance processing. The image data conforming to the Exif is configured such that data management, data exchange between devices, data output at an optimum setting, and the like are performed based on such information. Further, each of these four cameras is connected to the semiconductor device 100, and supplies the generated image data to the semiconductor device 100.

Among the four cameras, the camera 11F is installed at the front side of the automobile 1 so as to capture an image of the front of the automobile 1. Similarly, the camera 11L is installed on the left side of the automobile 1 so as to capture an image of the left of the automobile 1. Similarly, the camera 11B is installed at the rear side of the automobile 1 so as to capture an image of the rear of the automobile 1, and the camera 11R is installed at the right side of the automobile 1 so as to capture an image of the right of the automobile 1.

Note that each of the four cameras includes an overlapping image capturing region. Since the camera 11F that captures of an image of the front of the automobile 1 and the camera 11L that captures of an image of the left of the automobile 1 each capture an image of the left front of the automobile 1, the image capturing region of the camera 11F and the image capturing region of the camera 11L overlap with each other in the left front portion of the automobile 1. Similarly, the image capturing region of the camera 11L and the image capturing region of the camera 11B overlap with each other in the left rear portion of the automobile 1. Similarly, the image capturing region of the camera 11B and the image capturing region of the camera 11R overlap with each other in the right rear portion of the automobile 1, and the image capturing region of the camera 11R and the image capturing region of the camera 11F overlap with each other in the right front portion of the automobile 1, As described above, since the four cameras each include the overlapping regions, the image processing system 10 captures images of the front, rear, left, and right of the automobile 1 without a break.

The semiconductor device 100 acquires image data from the four cameras, performs predetermined processing on the acquired image data, and outputs the processed image data to the display device 12. The semiconductor device 100 is configured by electric components including a CPU, a memory, and the like, and is installed at any position of the automobile 1. The semiconductor device 100 includes an image data acquisition interface (IF) 110, a processor 120, an internal memory 130, and an image data output IF 140 as main components of the semiconductor device 100. Each component of the semiconductor device 100 is connected to each other by an internal bus.

The image data acquisition IF 110 is an interface for acquiring image data from the above described four cameras. When the image data acquisition IF 110 acquires image data from the cameras, the image data acquisition IF 110 supplies the acquired image data to the processor 120 or the internal memory 130.

The processor 120 is an arithmetic unit for performing predetermined processing on the image data acquired from the cameras in cooperation with the internal memory 130. As a main function, the processor 120 generates estimation source image data by canceling effect of initial color adjustment on the acquired image data. In addition, the processor 120 divides the estimation source image data (estimation source image) into processing regions having a plurality of pixels set in advance, performs color balance adjustment processing again for each processing region, and synthesizes the image data so that the overlapping regions overlap each other to generate a synthesized image.

The internal memory 130 is a storage unit for temporarily storing image data in cooperation with the processor 120. The internal memory 130 is configured by a volatile memory such as a Dynamic Random Access Memory (DRAM) or a Synchronous Dynamic Random Access Memory (SDRAM), a non-volatile memory such as a flash memory, or a combination thereof. The image data output IF 140 is an interface for outputting the processed image data generated by the processor to the display device.

The display device 12 is a device for displaying image data received from the semiconductor device 100, and includes an image data input circuit, a display unit, a display driver, and the like. The display unit is configured by, for example, a liquid crystal panel, an organic Electro Luminescence (EL) panel, a Head-up Display (HUD), or the like. For example, the display device 12 is installed, for example, on a dashboard, a center cluster, or the like which is easy for the driver to see.

Figure 3:
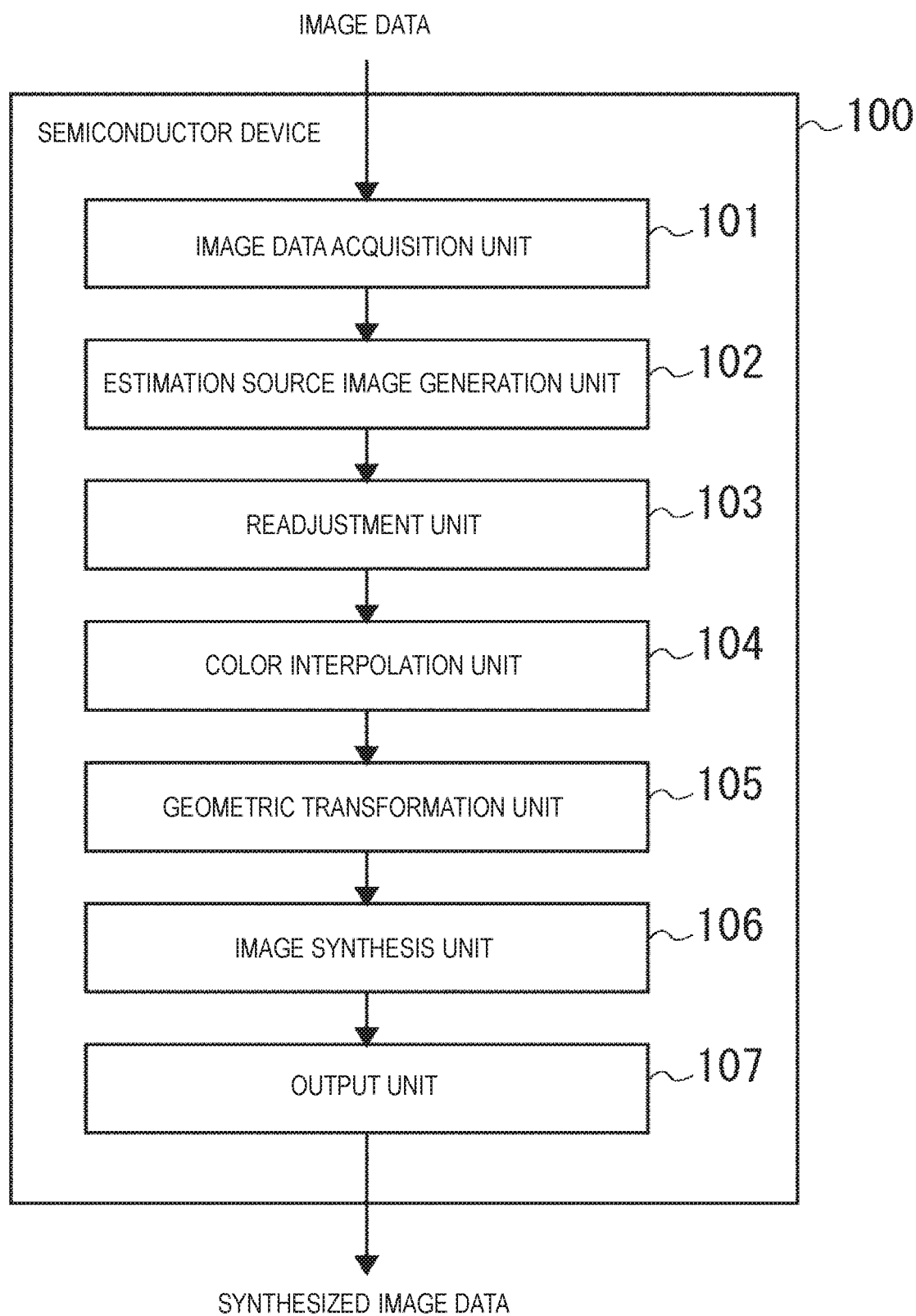
FIG. 3 is a functional block diagram of a semiconductor device according to the first embodiment.

Next, functions of the semiconductor device 100 and processing performed by the semiconductor device 100 will be described. FIG. 3 is a functional block diagram of the semiconductor device according to the first embodiment. The semiconductor device 100 includes an image data acquisition unit 101, an estimation source image generation unit 102, a readjustment unit 103, a color interpolation unit 104, a geometric transformation unit 105, an image synthesis unit 106, and an output unit 107, as a main functional blocks of the semiconductor device 100.

Figure 4:
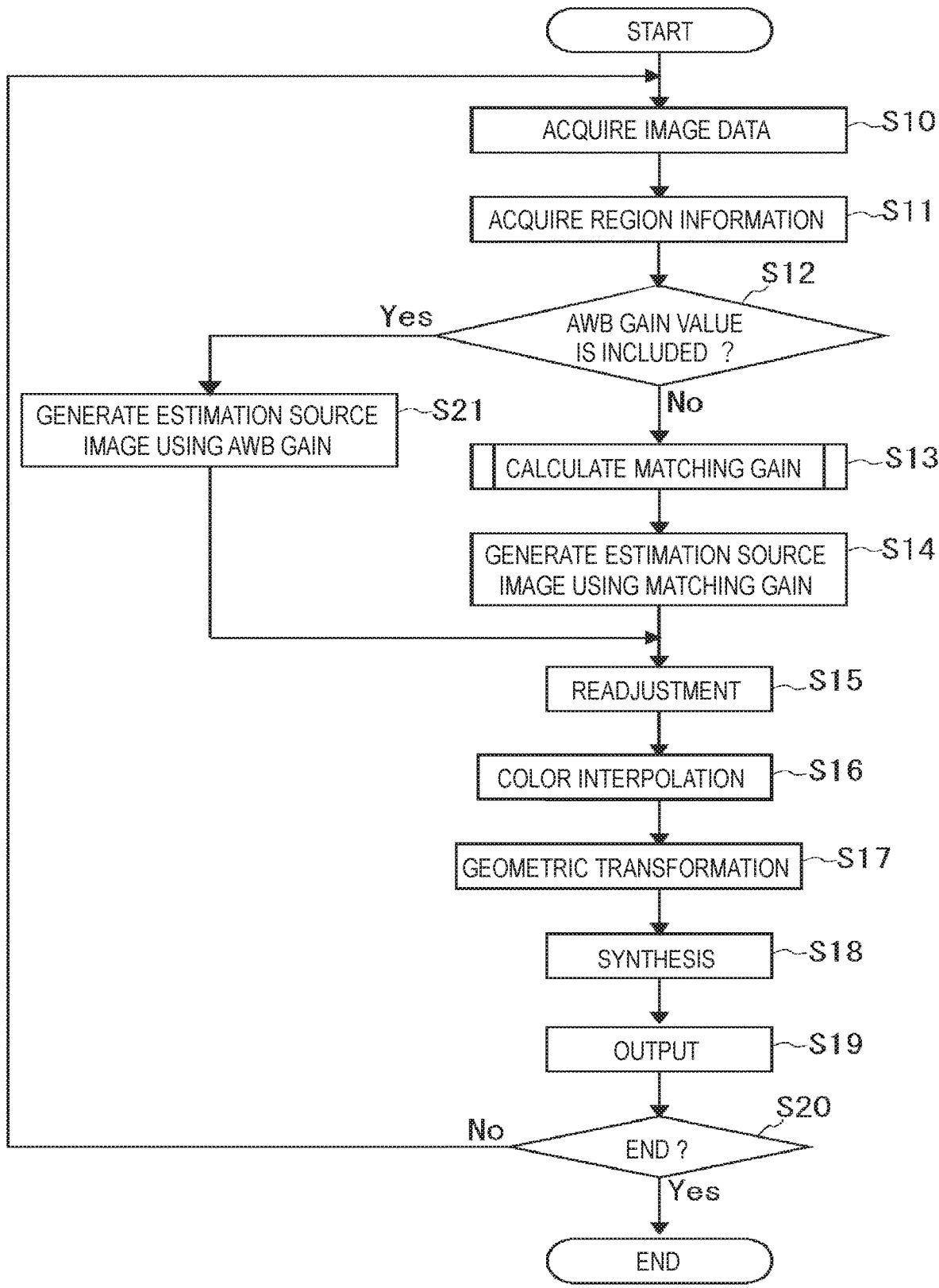
FIG. 4 is a flowchart showing processing of the semiconductor device according to the first embodiment.

FIG. 4 is a flowchart showing the processing of the semiconductor device according to the first embodiment. The semiconductor device 100 implements the processing of FIG. 4 by the functional blocks shown in FIG. 3. The processing of FIG. 4 will be described below with reference to the functional blocks of FIG. 3.

First, the image data acquisition unit 101 acquires image data from the four cameras described above (step S10). The image data acquired by the image data acquiring unit 101 has a file format conforming to the Exif. The image data includes, for example, an image composed of a plurality of pixels in a Joint Photographic Experts Group (JPEG) format. Each of the plurality of pixels has three signal levels of R, G, and B. Further, the image data includes information such as an AWB gain. The image data acquisition unit 101 supplies the acquired image data to the estimation source image generation unit 102.

Here, an example of deriving an AWB gain included in image data will be described. The ISP of the camera receives an image composed of a plurality of pixels from the image element. Each pixel of the plurality of pixels included in the image has three signal levels of R, G, and B. Each signal level is represented by an 8-bit gradation (0-255), Here, a set of the signal levels of R of the image is denoted by R0.

Similarly, a set of the signal levels of G of the image is denoted by G0, and a set of the signal levels of B of the image is denoted by B0. When the ISP of the camera receives an image from the image pickup device, the ISP extracts an achromatic color region from the center portion of the image. In the present disclosure, the term "achromatic color" refers to a color in which a difference between a maximum value and a minimum value of each signal level of RGB is smaller than a preset value. For example, the achromatic color in the present disclosure may be a color in which the difference between the maximum value and the minimum value of each signal level of RGB is smaller than 10. Here, a set of signal levels of R in the achromatic color region extracted by the ISP is defined as C_R0, Similarly, a set of signal levels of C in the achromatic color region is defined as C_G0, and a set of signal levels of B in the achromatic color region is defined as C_B0. Naturally, a plurality of pixels of the extracted achromatic color region are included in a plurality of pixels constituting the image. The of the camera determines an AWB gain to adjust color balance so that this achromatic color region approaches white. In the present disclosure, "white" means a color in which a difference between signal levels of R, G, and B is substantially 0. Specifically, the ISP determines the AWB gains (parameters) α, γ, and β to be multiplied by integrated values of C_R0, C_G0, and C_B0 so that the respective integrated values are equal in the following equation.

$$\alpha \int_{center\ of\ image} C\_R0 = \gamma \int_{center\ of\ image} C\_G0 = \beta \int_{center\ of\ image} C\_B0 \quad \text{[Equation 1]}$$

The ISP multiplies each of the AWB gains (parameters) α, γ, and β determined in this manner by each of signal levels R, and E of pixels of the entire image. As a result, the set of the signal levels of R of the image is changed to R1, the set of the signal levels of G of the image is changed to G1, and the set of the signal levels of B of the image is changed to B1. And, an image including R1, G1, and B1 is generated. This image is an image included in the image data described above.

$$\begin{pmatrix} R1 \\ G1 \\ B1 \end{pmatrix} = \begin{pmatrix} \alpha R0 \\ \gamma G0 \\ \beta B0 \end{pmatrix} \quad \text{[Equation 2]}$$

It should be noted that, finally, what color white is to be displayed is generally determined by a color setting of an output device such as a display or a printer. In this manner, the ISP generates a pixel signal in which the color balance of the pixel signal received from the image element is adjusted. Then, the ISP outputs image data obtained by adding various types of information corresponding to the Exif to the generated pixel signals.

The above processing is an example of AWB processing in a general camera. In the four cameras of the present disclosure, the same processing is performed. That is, each of the four cameras performs AWB processing. Therefore, values of the AWB gains determined by the four cameras are not necessarily the same.

Figure 5:
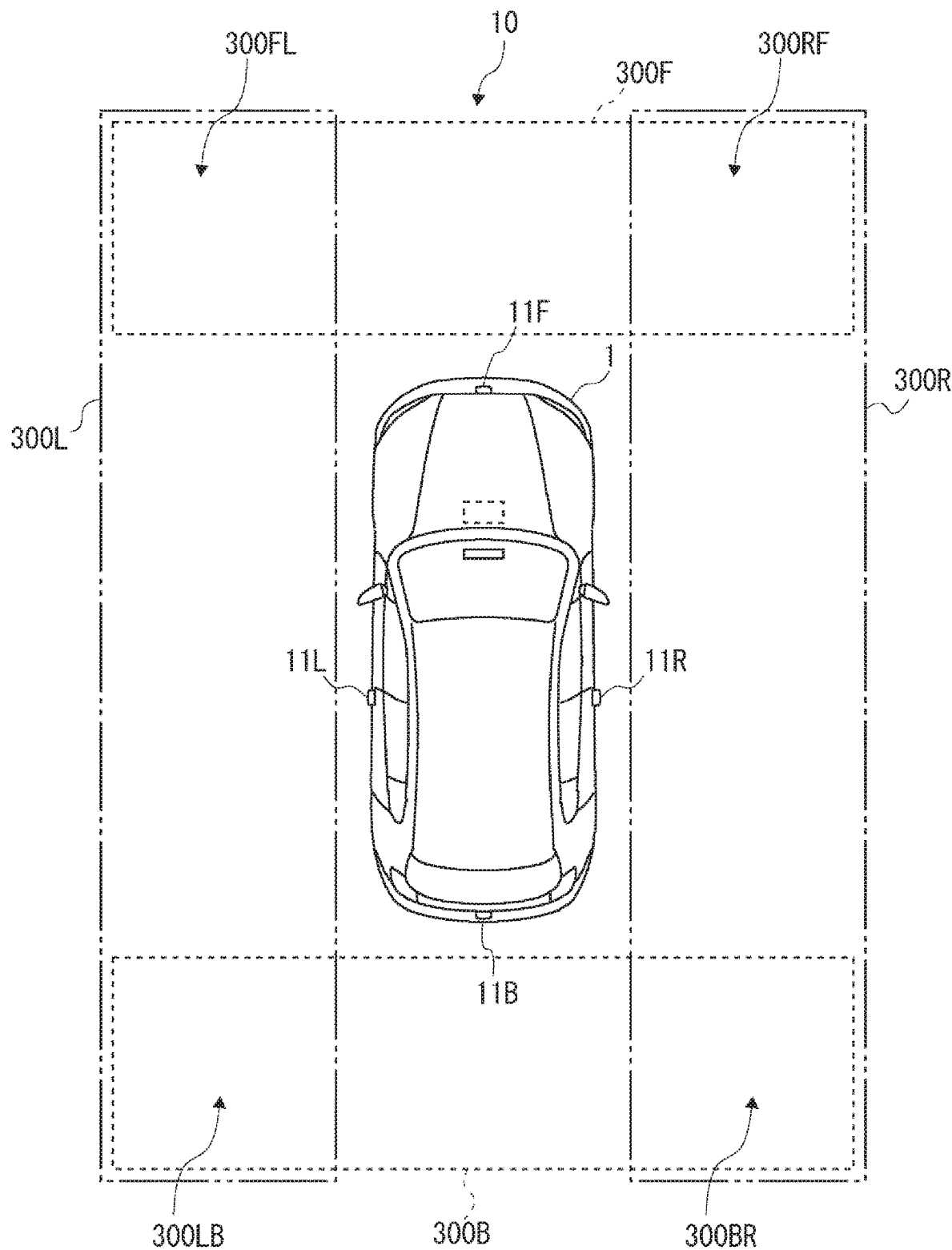
FIG. 5 is a diagram showing an example of image capturing regions captured by cameras of the image processing system.

Next, an image capturing region of an image will be described with reference to FIG. 5. FIG. 5 is a diagram showing an example of an imaging region imaged by a camera included in the image processing system. The camera 11F installed in the front side of the automobile 1 is set so as to capture an image in the image capturing region 300F. Similarly, the camera 11L installed on the left side of the automobile 1 is set to capturing of an image in an image capturing region 300L, the camera 11B installed on the rear side is set to capturing an image in the image capturing region 300B, and the camera 11R installed on the right side is set to capture an image in the image capturing region 300R.

Further, an overlapping region 300FL is a region where the image capturing region 300F of the camera 11F and the image capturing region 300L of the camera 11L overlap. Similarly, an overlapping region 300LB is a region in which the image capturing region 300L of the camera 11L and the image capturing region 3008 of the camera 113 overlap. Similarly, an overlapping region 300BR is a region where the image capturing region 3003 of the camera 113 and the image capturing region 300R of the camera 11R overlap. An overlapping region 300RF is a region where the image capturing region 300R of the camera 11R and the image capturing region 300F of the camera 11F overlap.

As described above, the images captured by the four cameras may include the overlapping regions, while the four cameras may determine the different AWB gains. Therefore, for example, when the AWB gain determined by the camera 11F for capturing the front image and the camera 11L for capturing the left image are different from each other, the color balance in the overlapping region 300FL included in the image capturing region 300F and the color balance of the overlapping region 300FL included in the image capturing region 300L are different from each other.

Next, the semiconductor device 100 acquires region information of each image data (step S11). The region information is information for defining a pixel signal included in image data acquired from each camera in a region having a plurality of pixels set in advance. For example, the region information includes, for example, information on an angle of view of image data to be acquired and an overlapping region, and is stored in advance is the internal memory 130. Therefore, the semiconductor device 100 compares the region information stored in advance with the image data acquired from the cameras 11F, for example, and thereby defines pixel signals included in the image data in a preset region.

Figure 6:
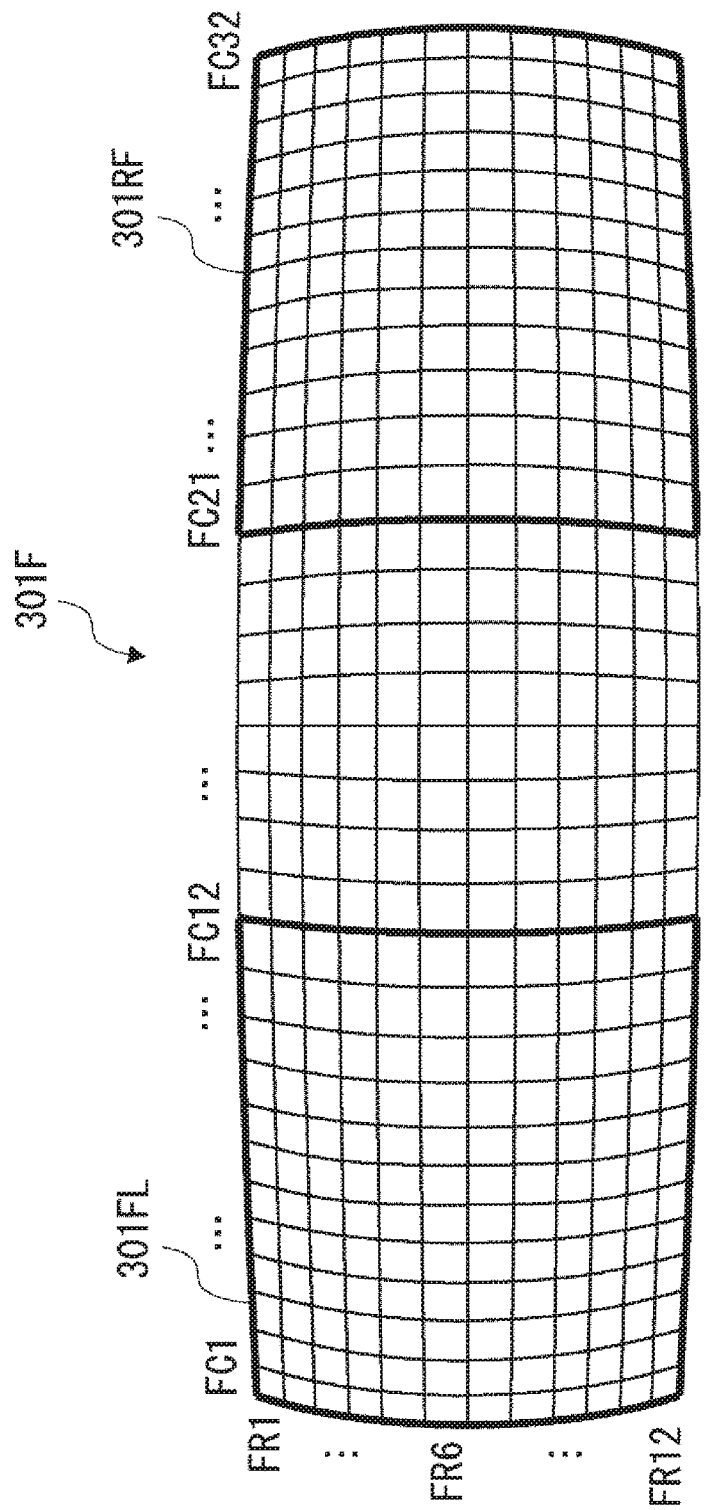
FIG. 6 is a diagram showing an example of image data generated by a front camera.

The region information will be described with reference to FIGS. 6 and 7. FIG. 6 is a diagram showing an example of image data generated by the front camera (camera 11F). The image data 301F shown in the drawing is generated by the camera 11F capturing an image of the image capturing region 300F. In the image data 301F, a barrel-shaped distortion occurs due to influence of aberration of a wide-angle lens of the camera 11F. In the present embodiment, the image data is shown in a barrel-shaped distorted form, but the image data supplied from the cameras is generally rectangular. Here, for easy understanding, image data of a portion used in a display region to be described later among rectangular image data is extracted and described.

The image data 301F is divided into lattice-shaped regions along the barrel-shaped distortion. In the present embodiment, the image data 301F is divided into 32 pieces in the horizontal direction and 12 pieces in the vertical direction starting from the left upper of the image. Each of the divided regions is hereinafter referred to as a processing region. That is, the image data 301F is divided into the 384(=32×12) processing regions. Here, for convenience of explanation, the image data 301F is given numbers from FC1 to FC32 in the horizontal direction and numbers from FR1 to FR12 in the vertical direction. For example, a left upper portion of the image data 301F is indicated as a processing region (FC1, FR1). The processing region is generated by the readjustment unit 103. In other words, the readjustment unit 103 divides the image data 301F into a plurality of processing regions in accordance with the region information.

An overlapping region 301FL indicated by a thick frame in the drawing is a region corresponding to the overlapping region 300FL shown in FIG. 5. The overlapping region 301FL occupies a range from a processing region (FC1, FR1) to a processing region (FC12, FR12). Similarly, an overlapping region 301RF indicated by a thick frame in the drawing is a region corresponding to the overlapping region 300RF shown in FIG. 5. The overlap region 301RF occupies a range from a processing region (FC21, FR1) to a processing region (FC32, FR12).

Figure 7:
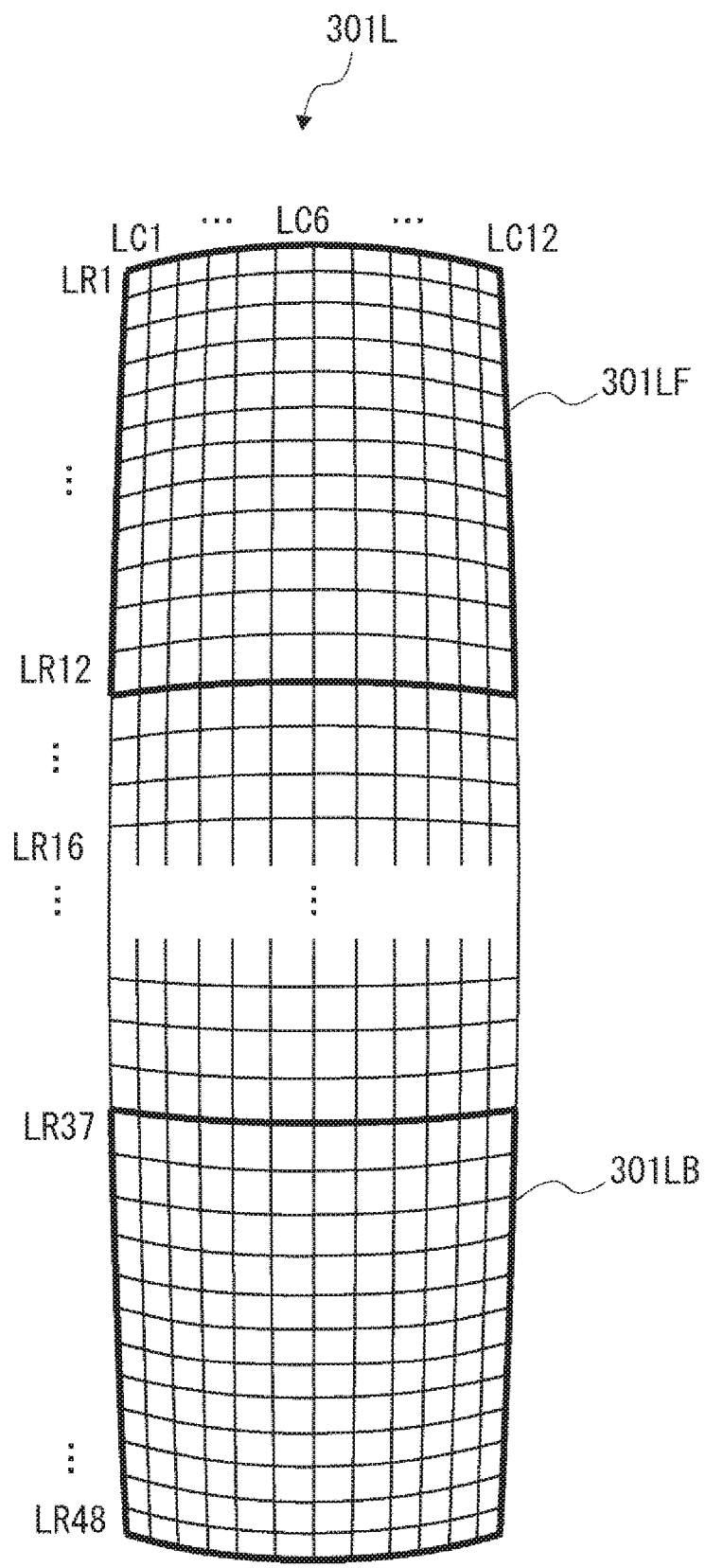
FIG. 7 is a diagram showing an example of image data generated by a left camera.

FIG. 7 is a diagram showing an example of image data generated by the left camera (camera 11L). The image data 301L shown in the drawing is generated by the camera 11L capturing an image of the image capturing region 300L. Note that the image data shown in FIG. 7 is also divided into processing regions having a plurality of pixels as in the description of FIG. 6, and numbers are given to the respective regions in the horizontal direction and the vertical direction so as to be able to indicate the respective regions. That is, the image data 301L is divided into 12 in the horizontal direction and 48 in the vertical direction, and is divided into the 576(=12×48) processing regions. A left upper portion of the image data 301L is denoted as a processing region (LC1, LR1), and a right lower portion of the image data 301L is denoted as a processing region (LC12, LR48).

An overlapping region 301LF indicated by a thick frame in the drawing is a region corresponding to the overlapping region. 300FL shown in FIG. 5. The overlap region 301LF occupies a range from a processing region. (LC1, LR1) to a processing region. (LC12, LR12). Similarly, an overlapping region 301LB indicated by a thick frame in the drawing is a region corresponding to the overlapping region 300LB shown in FIG. 5. The overlapping region 301LB occupies a range from a processing region (LC1, LR37) to a processing region (LC12, LR48).

Next, correspondence relationships between the overlapping regions will be described. The overlapping region 301FL of the image data 301F shown in FIG. 6 has a correspondence relationship with the overlapping region 301LF of the image data 301L shown in FIG. 7. More specifically, the processing region (FC1, FR1) of the image data 301F corresponds to the processing region (LC1, LR1) of the image data 301L, and they are image data obtained by capturing an image of a shared region. Similarly, the processing region (FC12, FR1) of the image data 301F corresponds to the processing region (LC12, LR1) of the image data 301L. Similarly, the processing region (FC1, FR12) of the image data 301E corresponds to the processing region (LC1, LR12) of the image data 301L. The processing region (FC12, FR12) of the image data 301F corresponds to the processing region (LC12, LR12) of the image data 301L.

The region information includes information capable of defining the processing regions and the overlapping regions of each of the above-described image data. Therefore, the semiconductor device 100 acquires the region information, defines the processing regions and the overlapping regions of each image data, and determines the correspondence relations between the overlapping regions.

Next, the estimation source image generation unit 102 performs processing of generating estimation source image data for each of the received image data in accordance with the following steps. The estimation source image generation unit 102 determines whether an AWB, gain value is included in the received image data (step S12). Here, the term "AWB gain value" indicates a specific value of the AWB gain, and does not include information such as "auto".

When the information on the AWB gain is not included in the image data (No in step S12), the estimation source image generation unit 102 calculates a matching gain (step S13). By calculating the matching gain and using the calculated matching gain, the semiconductor device 100 can cancel the effect of the initial color adjustment processing performed by the ISP on the image data.

Figure 8:
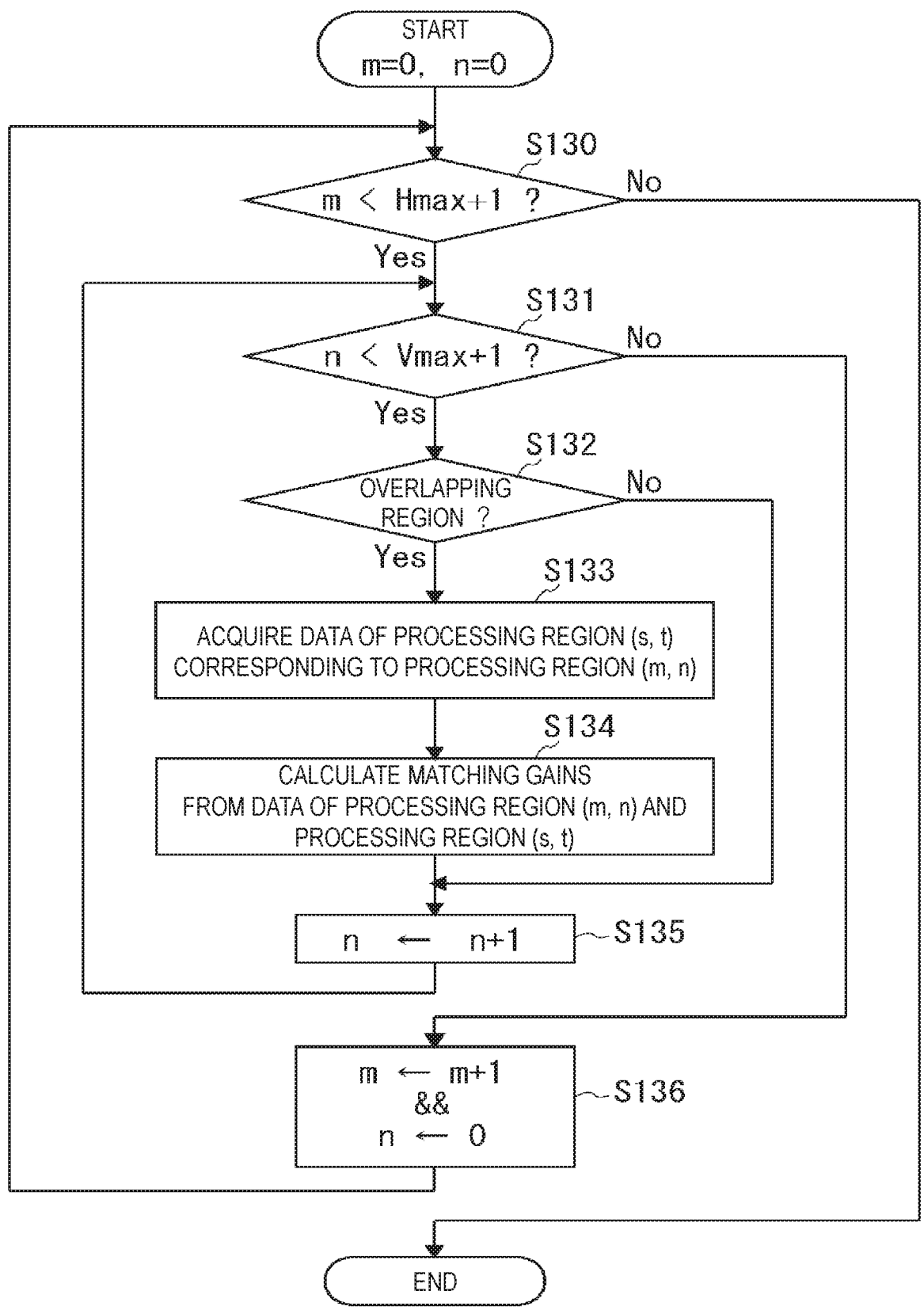
FIG. 8 is a flowchart showing a series of processing at a time of calculation of a matching gain performed by the semiconductor device.

Details of the processing in the step S13 will be described with reference to FIG. 8. FIG. 8 is a flowchart showing a series of processing at a time of calculation of the matting gain performed by the semiconductor device. The series of the processing at the time of calculating the matching gain will be described below by taking image data of an arbitrary image as an example. In the example described here, the processing proceeds while sequentially incrementing coordinates of the processing region in the horizontal direction of image data from 0 to Hmax and coordinates of the processing region in the vertical direction of image data from 0 to Vmax.

First, the estimation source image generation unit 102 determines whether or not a coordinate in the horizontal direction of a given processing region is less than Hmax+1 (step S130). When it is determined that the coordinate in the horizontal direction of the processing region is less than Hmax+1 (Yes in step S130), the estimation source image generation unit 102 determines whether a coordinate in the vertical direction is less than Vmax+1 (step S131). When the coordinate in the vertical direction is less than Vmax+1 (Yes in step S131), the estimation source image generation unit 102 determines whether or not the processing region is included in an overlapping region (step S132). When it is determined that the processing region is included in the overlapping region (Yes in step S132), the estimation source image generation unit 102 acquires data relating to signal levels of each of R, G, and B of a processing region (s, t) corresponding to the processing region (m, n) (step S133). The data relating to the signal levels for each of R, G, and B in the processing region (m, n) and the signal levels for each of R, G, and B in the processing region (s, t) handled here is, for example, a value obtained by averaging signal levels of specific pixels in the processing region having a plurality of pixels for each of R, G, and B. The specific pixel is a pixel having an achromatic color and a luminance value higher than a preset value. Further, the preset value is, for example, 200 or more of 256 gradations. In addition, when there are not enough specific pixels in each processing region (e. g., 5% or more), it is considered that information for estimating an original light source is not sufficiently obtained, and a matching gain to be described later is not calculated in this processing region.

Next, the estimation source image generation unit 102 calculates matching gains from the data relating to the signal levels for each of R, G, and B of the processing region (m, n) described above and the data relating to the signal levels for each of R, G, and B of the processing region (s, t) (step S134). Here, for example, the signal levels of each color in the processing region (m, n) included in the image data 301F and the signal levels of each color in the processing region (s, t) included in the image data 301L can be defined by the following equation.

$$\begin{pmatrix} \frac{1}{\alpha} F_{(m,n)\_R} \\ \frac{1}{\gamma} F_{(m,n)\_G} \\ \frac{1}{\beta} F_{(m,n)\_B} \end{pmatrix} = \begin{pmatrix} \frac{1}{\alpha'} L_{(s,t)\_R} \\ \frac{1}{\gamma'} L_{(s,t)\_G} \\ \frac{1}{\beta'} L_{(s,t)\_B} \end{pmatrix} \quad \text{[Equation 3]}$$

Here, $\alpha$ is an AWB gain (parameter) for the R signal of the image data 301F, $\gamma$ is an AWB gain (parameter) for the G signal of the image data 301F, and $\beta$ is an AWB gain (parameter) for the B signal of the image data 301F. $F_{(m, n)\_R}$ is a value obtained by averaging the signal levels of R of pixels, which are achromatic color and have luminance values higher than a preset value, in the region (m, n), $F_{(m, n)\_G}$ is a value obtained by averaging the signal levels of G of pixels, which are achromatic color and have luminance values higher than a preset value, in the region (m, n), and $F_{(m, n)\_B}$, is a value obtained by averaging the signal levels of B of pixels, which are achromatic color and have luminance values higher than a preset value in the region (m, n). $\alpha'$ is an AWB gain (parameter) for the R signal of the image data 301L, $\gamma'$ is an AWB gain (parameter) for the G signal of the image data 301L, and $\beta'$ is an AWB gain (parameter) for the B signal of the image data 301L. $L_{(s, t)\_R}$ is a value obtained by averaging the signal levels of R of pixels, which are achromatic color and have luminance values higher than a preset value, in the region (s, t), $L_{(s, t)\_G}$ is a value obtained by averaging the signal levels of G of pixels, which are achromatic color and have luminance values higher than a preset value, in the region (s, t), and $L_{(s, t)\_B}$ is a value obtained by averaging the signal levels of B of pixels, which are achromatic color and have luminance values higher than a preset value, in the region (s, t). As shown in the equation 3, pixel signals of regions corresponding to the overlapping regions are multiplied inverse numbers of the AWB gains applied by the ISPs of the cameras, respectively, and become pixel signals before adjusting color balance. As a result, signal levels for each color between the corresponding regions are equal for each other.

Using the above principle, a gain for matching signal levels of each color of the regions corresponding to the overlapping region with respect to image data that does not include the information on the AWB gain is calculated in accordance with the following equation.

$$\begin{pmatrix} \alpha_{Fe} F_{(m,n)\_R} \\ \gamma_{Fe} F_{(m,n)\_G} \\ \beta_{Fe} F_{(m,n)\_B} \end{pmatrix} = \begin{pmatrix} \alpha_{Le} L_{(s,t)\_R} \\ \gamma_{Le} L_{(s,t)\_G} \\ \beta_{Le} L_{(s,t)\_B} \end{pmatrix} = \frac{1}{2} \begin{pmatrix} F_{(m,n)\_R} + L_{(s,t)\_R} \\ F_{(m,n)\_G} + L_{(s,t)\_G} \\ F_{(m,n)\_B} + L_{(s,t)\_B} \end{pmatrix} \quad \text{[Equation 4]}$$

Here, $\alpha_{Fe}$ is a matching gain (parameter) for the P signal in the processing region (m, n) of the image data 301F. Similarly, $\gamma_{Fe}$ is a matching gain (parameter) of the G signal in the processing region (m, n) of the image data 301F, and $\beta_{Fe}$ is a matching gain (parameter) of the B signal in the processing region (m, n) of the image data 301F. Further, $\alpha_{Le}$ is a matching gain (parameter) of the R signal in the processing region (s, t) of the image data 301L. Similarly, $\gamma_{Le}$ is a matching gain (parameter) of the G signal in the processing region (s, t) of the image data 301L, and $\beta_{Le}$ is a matching gain (parameter) of the B signal in the processing region (s, t) of the image data 301L.

As described above, the estimation source image generation unit 102 calculates the matching gains for each of the received image data. However, the above example is based on the assumption that the processing regions having the correspondence relationship in the overlapping regions completely overlap. In the case where the processing regions having the correspondence relationship do not completely overlap, and are shifted in position, a matching gain is calculated by weighting as described below.

Figure 9:
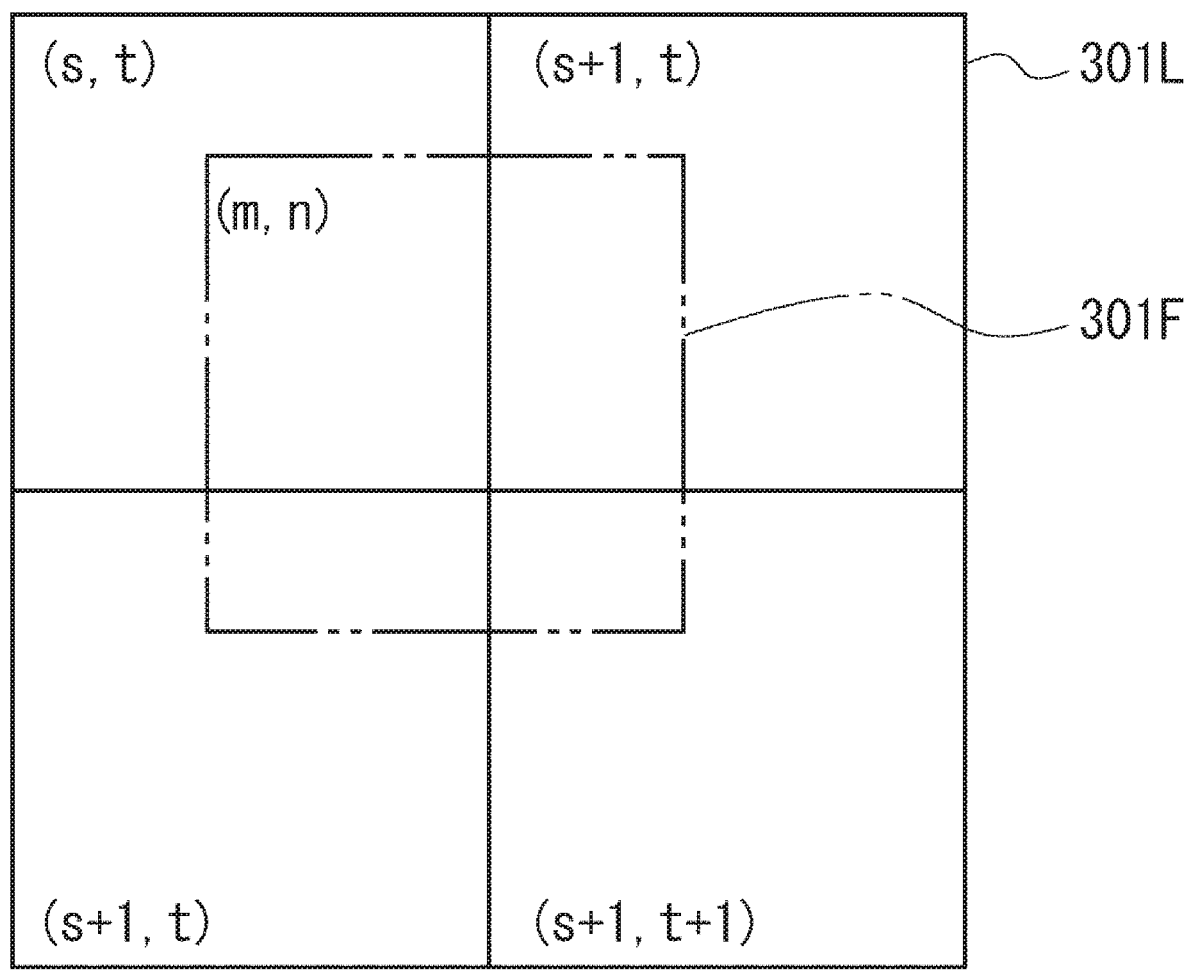
FIG. 9 is a diagram showing an example in which processing regions in overlapping regions do not completely overlap.

FIG. 9 is a diagram showing an example in which the processing regions in the overlapping regions do not completely overlap. As shown in the drawing, the processing region (m, of the image data 301F does not completely overlap the corresponding processing region (s, t) of the image data 301L, and the processing region (m, n) is shifted to the right lower with respect to the processing region (s, t). In such a case, a matching gain is calculated weighting as shown in the following equation.

$$\alpha_{Fe} F_{(m,n)_R} = $$
$$\alpha_{Le} L_{(s,t)_R} = \frac{1}{2} \left\{ F_{(m,n)_R} + \frac{w_1 + L_{(s,t)_R} + w_2 \times L_{(s+1,t)_R} + w_3 \times L_{(s,t+1)_R} + w_4 \times L_{(s+1,t+1)_R}}{4} \right\} \quad \text{[Equation 5]}$$

Here, $W_1$, $W_2$ and $W_4$ is a weighting factor, and $W_1+W_2+W_3+W_4=4$.

Returning to FIG. 8, after the matching gain is calculated in a step S134, the estimation source image generation unit 102 increments n in order to move a region in which a matching gain is calculated (step S135). After incrementing n, the estimation source image generation unit 102 returns to the step S131 and continues the processing.

If it is not determined in the step S132 that the processing region is included in the overlapping region (No in step S132), the estimation source image generation unit 102 proceeds to the step S135 and performs processing for incrementing n (step S135).

In the step S131, when n exceeds the Vmax value which is a maximum value of the coordinate in the vertical direction, the estimation source image generation unit 102 does not determine that n is less than the VMax+1 (No in step S131). In this case, the estimation source image generation unit 102 sets n to zero and increments m (in step S136). Then, the estimation source image generation unit 102 returns to the step S130 and continues the processing. In the step S130, when m exceeds the Hmax value which is a maximum value of the coordinate in the horizontal direction, the estimation source image generation unit 102 does not determine that m is less than the Hmax+1 (No in step S130). In this case, the estimation source image generation unit 102 ends the series of the processing.

In the example of the matching gain calculation described in the present embodiment, the matching gain is calculated for each processing region. The semiconductor device 100 may further calculate an average value of a plurality of matching gains calculated in this manner. Instead of the average value, a value based on a standard deviation may be calculated, or a representative value may be selected. Alternatively, these calculations may be performed after excluding outliers. Further, from the viewpoint of calculating the average value of the plurality of matching gains, a plurality of regions may be grouped as one processing region, and the matching gain may be calculated for each of the plurality of processing regions of the image data.

Furthermore, for example, the estimation source image generation unit 102 performs the above-described calculation processing on the image data 301F in relation to the image data 301L having the overlapping region corresponding to the overlapping region of the image data 301F, and similarly performs the above-described calculation processing on the image data 301F in relation to the image data 301R having the overlapping region corresponding to the overlapping region of the image data 301F. Therefore, the estimation source image generation unit 102 determines one matching gain for the image data 301F from all the matching gains.

Returning to FIG. 4, the estimation source image generation unit 102 generates an estimation source image using the matching gain calculated as described above (step S14). By using the matching gain, for example, the signal levels for each of R, G, and B of the image data 301F and the signal levels for each of R, G, and B of the image data 301L have the following relationship.

$$\begin{pmatrix} \alpha_{Fe}F\_R \\ \gamma_{Fe}F\_G \\ \beta_{Fe}F\_B \end{pmatrix} \approx \begin{pmatrix} \alpha_{Le}L\_R \\ \gamma_{Le}L\_G \\ \beta_{Le}L\_B \end{pmatrix}$$ [Equation 6]

Here, $\alpha_{FE}$, $\gamma_{FE}$, and $\beta_{FE}$ are matching gains (parameters) for the image data 301F, and $\alpha_{LE}$, $\gamma_{LE}$, and $\gamma_{LE}$ are matching gains (parameters) for the image data 301L. The estimation source image generation unit 102 calculates, for each image data, a matching gain for matching the signal levels of each color in the processing regions corresponding to each other in the overlapping regions, and multiplies the matching gain by the signal level of each color of the pixels included in the corresponding image data. Thus, the estimation source image generation unit 102 generates the estimation source image data. As described above, by calculating a matching gain and using the calculated matching gain, the semiconductor device 100 can cancel the effect of the initial color adjustment processing performed by the ISP on the image data.

Returning to the step 12, when the information on the AWB gain is included in the image data (Yes in step S12), the estimation source image generation unit 102 generates an estimation source image using the AWB gain (step S21). In this case, the estimation source image generation unit 102 can cancel the effect of the initial color adjustment processing performed by the ISP on the image data by multiplying pixel signals of each region by an inverse number of a value of the AWB gain.

Next, as shown in FIG. 3, the estimation source image generation unit 102 cancels the effects of the initial color adjustment processing performed by the ISPs using the processing of the step S14 or the step S21 as described above, and then supplies image data of the generated estimation source images to the readjustment unit 103.

Next, as shown in FIG. 4, the readjustment unit 103 obtains a readjustment gain in each processing region from the received image data (step S15). The readjustment is a processing of readjusting color balance of the estimation source image data. For example, the readjustment unit 103 calculates a readjustment gain for each of a maximum of 384 processing regions with respect to the image data 301F.

In calculating the readjustment gain, first, the readjustment unit 103 divides the image data of the received estimation source image into processing regions, and extracts, from the divided processing regions, pixels which are achromatic color and have each signal level of R, G, and B higher than a preset value, as reference pixels. The preset value is, for example, 200 or more of 256 gradations. When the reference pixel occupies 5% or more of the pixels in the processing region, the readjustment unit 103 calculates a readjustment gain using the reference pixel.

An example of a method of calculating the readjustment gain will be described below. The readjustment gain is calculated by the following equation, for example.

$$\begin{pmatrix} \alpha_{wb} \\ \gamma_{wb} \\ \beta_{wb} \end{pmatrix} = \begin{pmatrix} \frac{MIN(R, G, B)}{AVR(R)} \\ \frac{MIN(R, G, B)}{AVR(G)} \\ \frac{MIN(R, G, B)}{AVR(B)} \end{pmatrix}$$ [Equation 7]

Here, $\alpha_{wb}$, $\gamma_{wb}$, and $\beta_{wb}$ are readjustment gains (parameters) in a given processing region. AVR(R), AVR(G), and AVR(B) are average signal levels of the respective colors of the reference pixels. Further, MIN (R, G, B) is a minimum value of the average signal levels (AVR(R), AVR(G), AVR (B)) of each color.

The calculation of the readjustment gain will be described using a specific example. For example, it is assumed that an average signal level of a plurality of reference pixels in a certain processing region is (R, G, B)=(200, 210, 205). In this case, a minimum value of the average signal level is 200. Therefore, a readjustment gain is ($\alpha_{wb}$, $\gamma_{wb}$, $\beta_{wb}$)=(200/200, 200/210, 200/205)=(1, 0.95, 0.98). The equation 7 is an example, and for example, the denominator may be changed from the average signal level of each color of the reference pixels to a maximum value (210 in the case of the above specific example) and the numerator may be changed from the minimum value to the average signal level of each color of the reference pixels.

After calculating a readjustment gain, the readjustment unit 103 performs readjustment processing for each processing region using the calculated readjustment gain. If the reference pixels do not occupy 5% or more of the pixels in the processing region, the processing is performed using a surrounding readjustment gain.

When there is a plurality of adjacent gains which is readjustment gains of adjacent processing regions, the readjustment unit 103 may calculate an average value of the plurality of adjacent gains and use the average value as a readjustment gain for the color balance of the processing region which to be processed.

When the reference pixels do not occupy 5% or more of the pixels in the processing region, the readjustment unit 103 may store a plurality of past gains, which are readjustment gains used in the past corresponding to the processing region, and may use an average value of the past gains as a readjustment gain of the processing region to be processed. That is, the image data acquisition unit 101 may continuously acquire image data at a plurality of different times from a plurality of ISPs. In this case, image data acquired at a predetermined timing is referred to as image data for one frame. In such a case, the readjustment unit 103 may use, as a past gain, an average value of readjustment gains from in a processing region before one frame to in a processing region of a frame at a time point which is back by a preset period. The average value includes a weighted average value and a moving average value.

After obtaining the readjustment gain for each processing region in this manner, the readjustment unit 103 supplies the image data together with the readjustment gain to the color interpolation unit 104. The readjustment unit 103 divides the estimation source image data so that one or more processing regions are included in an overlapping region. By performing such processing, the semiconductor device 100 can preferably perform white balancing processing in an overlapping region.

Next, the color interpolation unit 104 performs color interpolation processing on the pixels of each of the processing regions of the image data based on the readjustment gain and the image data received from the readjustment unit 103 (step S16). At this time, the color interpolation unit 104 performs the color interpolation processing when the value of the readjustment gain in the predetermined processing region to be processed is greatly different from the value of the adjacent readjustment gain that is the readjustment gain of the adjacent processing region. This is because, if the value of the readjustment gain is greatly different from the value of the adjacent readjustment gain, a boundary (abrupt color change) which does not exist originally occurs between the processing region and the processing region adjacent thereto. Therefore, color interpolation processing is performed on the pixels of the processing regions in order to suppress occurrence of the boundary that does not originally exist.

Figure 10:
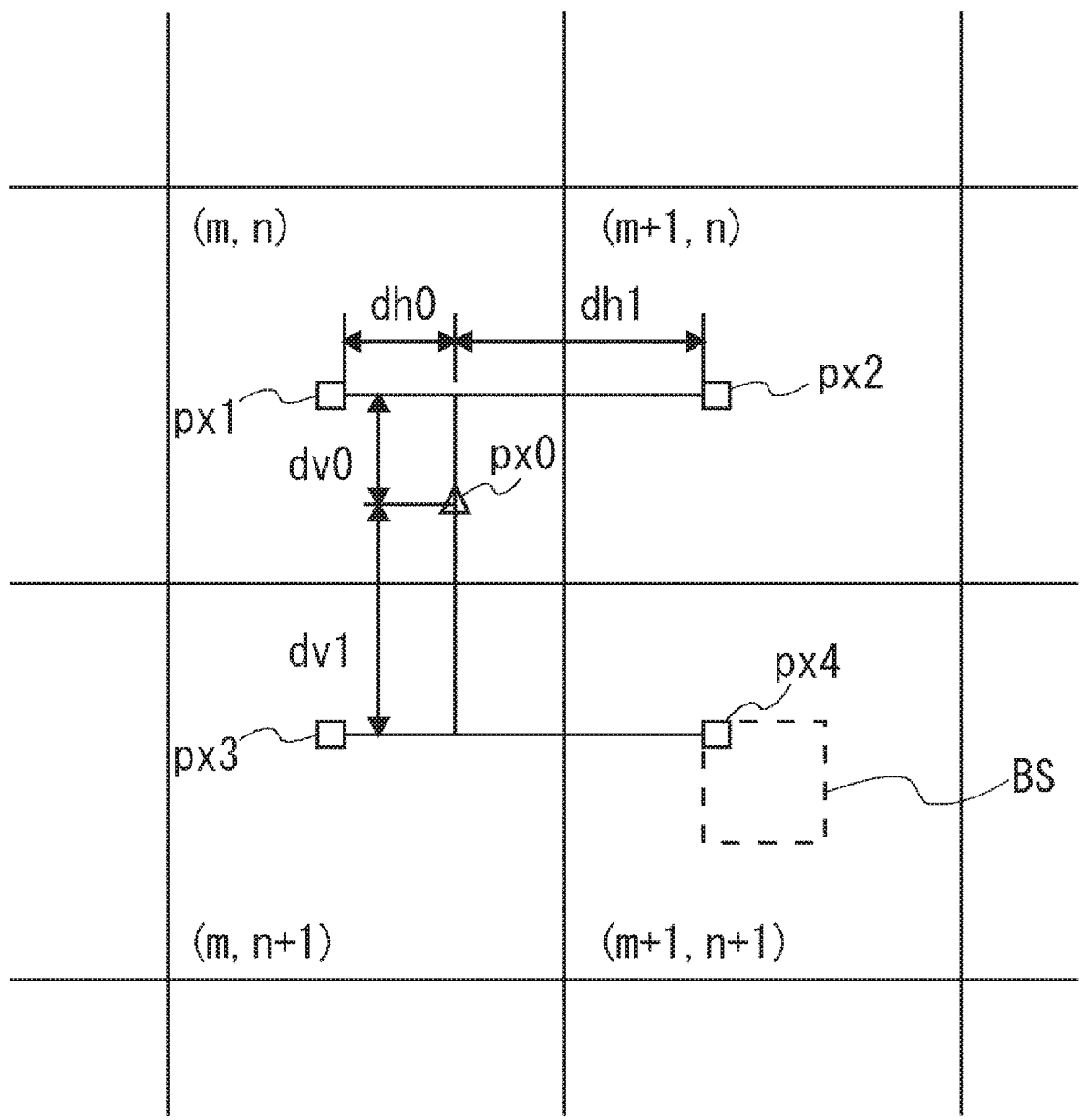
FIG. 10 is a diagram showing an example of interpolation processing using adjacent regions.

An example of the color interpolation processing will be described with reference to FIG. 10. FIG. 10 is a diagram showing an example of interpolation processing using adjacent regions. The example shown in the drawing is an example in which processing of interpolating a given pixel px0 in the processing region (m, n) is performed using surrounding pixels px1 to px4. In the drawing, the pixel px1 is a pixel at the center portion of the processing region (m, n). Further, the pixel px2 is a pixel at the center portion of the processing region (m+1, n). Similarly, the pixel px3 is a pixel at the center portion of the processing region (m, n+1), and the pixel px4 is a pixel at the center portion of the processing region (m+1, n+1). The pixel px1 and the pixel px2 have the same coordinate in the vertical direction, and the pixel px1 and the pixel px3 have the same coordinate in the horizontal direction. In addition, the pixel px2 and the pixel px4 have the same coordinate in the horizontal direction, and the px3 and the px4 have the same coordinate in the vertical direction. The pixel px0 to be interpolated exists at any position within a rectangle formed by the pixels px1 to px4. A horizontal distance from the pixel px0 to the pixel px1 or the pixel px3 is dh0, and a horizontal distance from the pixel px0 to the pixel px2 or pixel px4 is dh1. A vertical distance from the pixel px0 to the pixel px1 or the pixel px2 is dv0, and a vertical distance from the pixel px0 to the pixel px3 or the pixel px4 is dv1. A readjustment gain for the pixel px1 is g1, a readjustment gain for the pixel px2 is g2, a readjustment gain for the pixel px3 is g3, and a readjustment gain for the pixel px4 is g4. Under the above circumstances, a gain of the pixel px0 is calculated by the following interpolating processing.

First, a horizontal gain is calculated by the following equation.

$$g12 = \frac{g1 \times dh1 + g2 \times dh0}{dh0 + dh1}$$ [Equation 8]

$$g34 = \frac{g3 \times dh1 + g4 \times dh0}{dh0 + dh1}$$ [Equation 9]

Next, a gain g0 for the pixel px0 is calculated as follows using a gain g12 calculated by the equation 8 and a gain g34 calculated by the equation 9.

$$g0 = \frac{g12 \times dv1 + g34 \times dv0}{dv0 + dv1}$$ [Equation 10]

The color interpolation unit 104 calculates an interpolation gain for each pixel in the region surrounded by the pixels px1 to px4 by the readjustment gain linearly interpolated in this manner, and performs color interpolation processing using the calculated interpolation gain. Note that the above-described interpolation processing is merely an example, and interpolation processing using a bi-cubic method, a nearest neighbor method, or the like may be performed instead of the above-described linear interpolation processing.

Note that the color interpolation unit 104 may be set so as not to perform color interpolation processing for a predetermined region within a processing region. A non-interpolation region BS shown in FIG. 10 is a predetermined region at the center portion of the processing region m+1 and n+1. By providing a region in which color interpolation processing is not performed at the center portion of the processing region in this manner, it is possible to produce an image in which a result of readjustment processing is given priority. In addition, if a joint (boundary) between processing regions is conspicuous, the joint can be made inconspicuous by reducing a size of a non-interpolation region BS and performing interpolation processing in a wider range.

Figure 11:
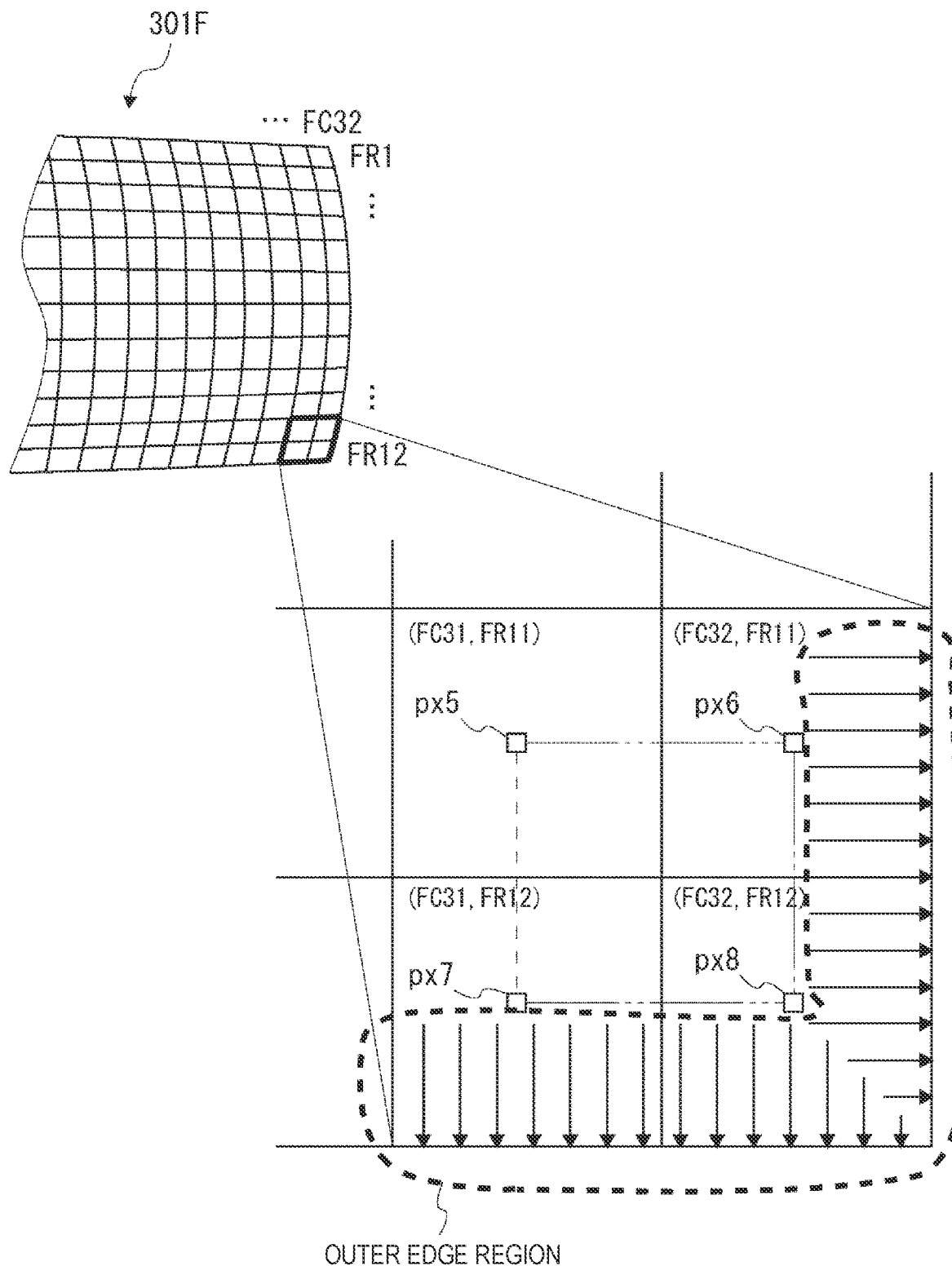
FIG. 11 is a diagram showing an example of interpolation process at the end of an image.

In addition to the above-described color interpolation processing, the color interpolation unit 104 performs interpolation processing for a processing region of an outer edge portion of image data, FIG. 11 is a diagram showing an example of interpolation processing at an outer edge portion of an image. FIG. 11 shows an enlarged view of a processing region (FC31, FR11), a processing region (FC32, FR11), a processing region (FC31, FR12), and a processing region (FC32, FR12) in the right lower portion of the image data 301F. In the outer edge region shown in the drawing, there is no adjacent processing region.

In such a case, the color interpolation unit 104 performs linear interpolation processing on pixels in the outer edge region using, for example, a pixel px5 at the center portion of the processing region (FC31, FR11), a pixel px6 at the center portion of the processing region (FC32, FR11), a pixel px7 at the center portion of the processing region (FC31, FR12), and a pixel px8 of the center portion of the processing region (FC32, FR12).

After performing the above-described color interpolation processing, the color interpolation unit 104 supplies the image data to the geometric transformation unit 105. Upon receiving the image data from the color interpolation unit 104, the geometric transformation unit 105 performs geometric transformation processing on the image data (step S17).

Figure 12:
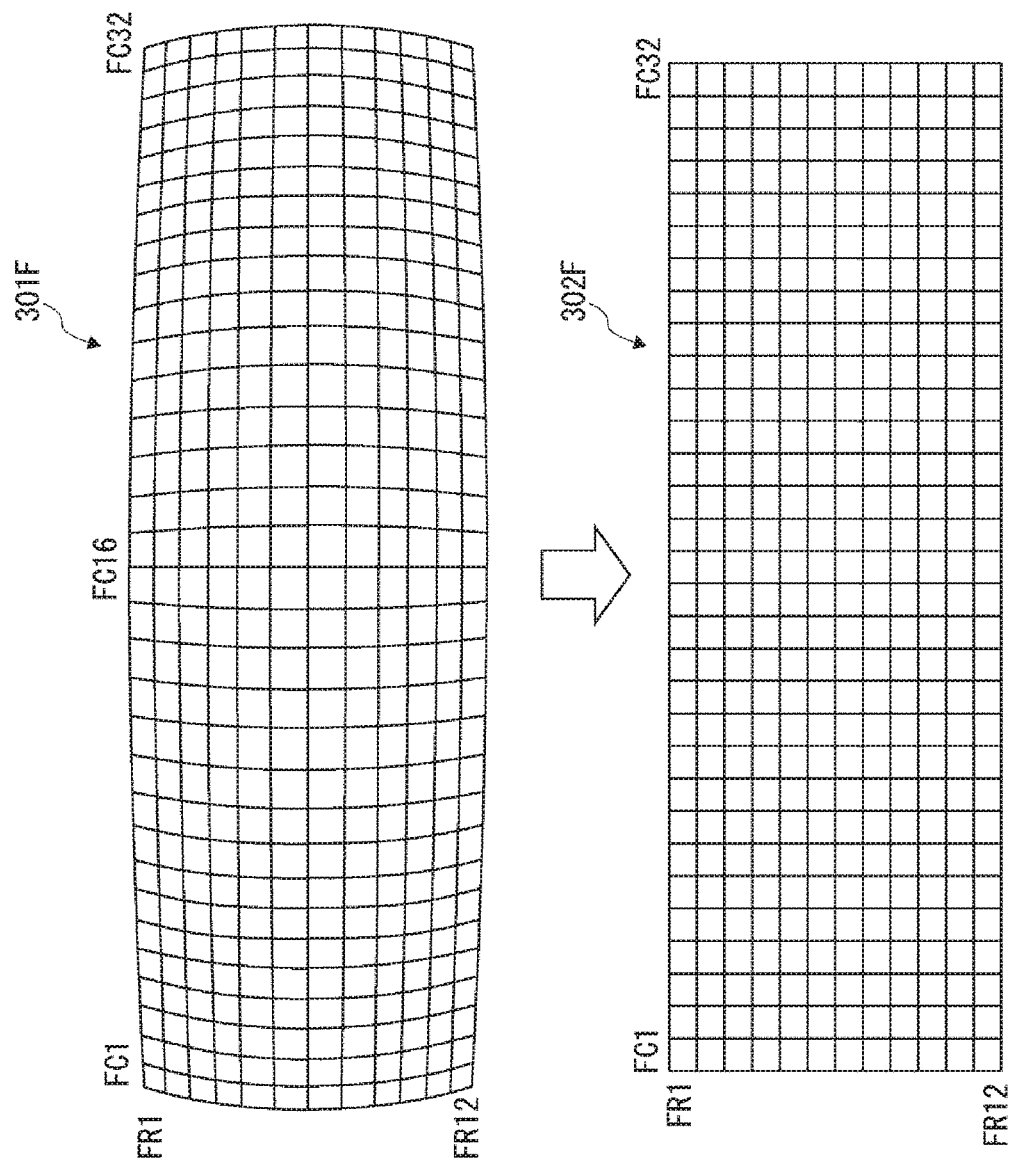
FIG. 12 is a diagram showing an example of performing geometric transformation processing on an image according to the first embodiment.

FIG. 12 is a diagram showing an example of performing geometric transformation processing on an image according to the first embodiment. A barrel-shaped image shown in the upper side of the drawing is the image data 301F subjected to color interpolation processing. The geometric transformation unit 105 performs geometric transformation processing on the image data 301F. As a result, the image data 301F is transformed into rectangular image data 302F by eliminating a barrel-shaped distortion caused by influence of aberration of a wide-angle lens. The geometric transformation unit 105 performs such processing on each of the image data 301F, 301L, 301B, and 301R obtained from the four cameras mounted on the automobile 1 and subjected to the processing described above. As a result, the image data acquired from the four cameras are transformed into rectangular images.

In the description of the present embodiment, the example of correcting a barrel-shaped distortion by performing geometric transformation processing on barrel-shaped image data has been shown, but in addition to the processing of correcting the barrel-shaped distortion, the image data may be subjected to linear transformation processing such as trapezoidal correction. When capturing an image of the periphery of the automobile 1 from the cameras mounted on the automobile 1 and generating an image to be subjected to viewpoint conversion processing called surround view from the captured image, the semiconductor device 100 performs such viewpoint conversion processing, and performs the above-described linear transformation along with this processing.

Figure 13:
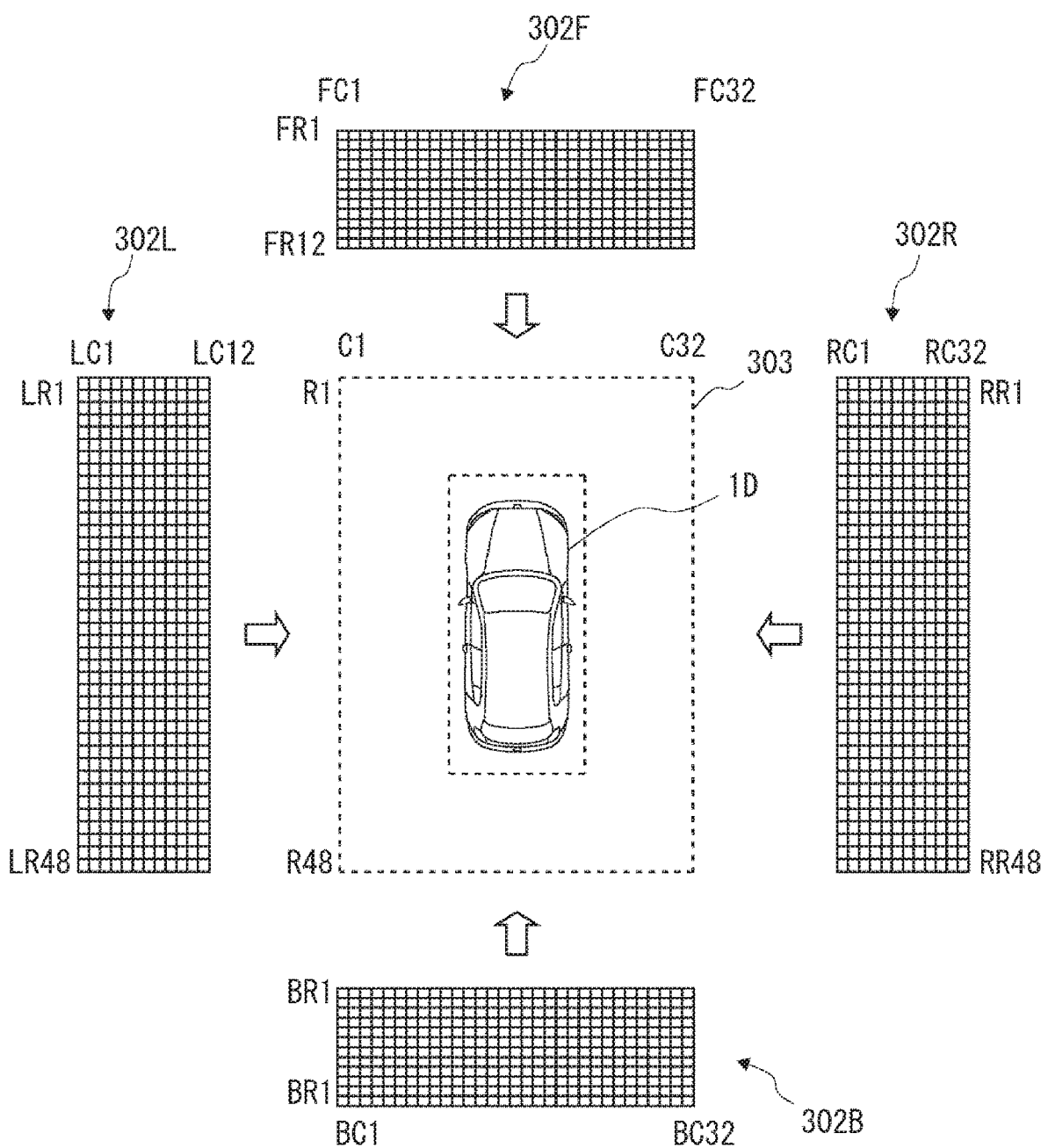
FIG. 13 is a diagram schematically showing an example of performing processing for synthesizing images according to the first embodiment.

Next, the geometric transformation unit 105 performs the geometric transformation processing described above, and then supplies the image data to the image synthesis unit 106. Then, the image synthesis unit 106 performs processing for synthesizing the received image data (step S18), FIG. 13 is a diagram schematically showing an example of performing processing for synthesizing images according to the first embodiment. On the upper side of the drawing, image data 302F transformed into a rectangular image by the geometric transformation unit 105 is shown. Similarly, image data 302L, image data 302B, and image data 302R are shown on the left side, the lower side, and the right side of the drawing, respectively. Synthesized image data 303 is shown in a portion surrounded by these four image data.

The synthesized image data 303 is configured to superimpose the overlapping regions of the image data 302F, 302L, 302B, and 302R. For example, the processing region (FC1, FR1) of the image data 302F corresponds to the processing region (LC1, LR1) of the image data 302L. Therefore, in the synthesized image data 303, the processing region (FC1, FR1) of the image data 302F and the processing region (LC1, LR1) of the image data 302L are superimposed.

Further, a size of the synthesized image data 303 in the horizontal direction is configured to coincide with a size of the image data 302F in the horizontal direction and a size of the image data 302B in the horizontal direction. A size of the synthesized image data 303 in the vertical direction is configured to coincide with a size of the image data 302L in the vertical direction and a size of the image data 302R in the vertical direction. Therefore, in the synthesized image data 303, C1 to C32 are shown in the horizontal direction, and R1 to R48 are shown in the vertical direction.

Furthermore, in the synthesized image data 303 generated from these four image data, image data does not exist in the center portion. Therefore, the semiconductor device 100 superimposes image data 1D of a dummy automobile stored in advance on the synthesized image data 303. As a result, the synthesized image data 303 generates an image in which a driver looks at an automobile he/she drives from above the automobile. In such a system, displaying an image with a suitable color balance so that a driver can easily recognize objects may contribute to improving safety of an automobile and environment surrounding the automobile.

Before the image data 302F, 302L, 302B, and 3021R are received by the image synthesis unit 106, effects of initial color adjustment processing performed by the ISPs on the image data 302F, 302L, 302B, and 3021R are canceled, and color balance of the image data is readjusted by readjustment gains. Therefore, even if the processing regions having such a correspondence relationship are superimposed, the synthesized image data 303 as a whole can maintain a suitable color balance.

In addition, when the processing regions having such a correspondence relationship are superimposed, there is a case where signal levels of each of R, G, and B of pixels included in the two processing region having the correspondence relationship completely do not coincide and are different from each other. In such a case, an average value of the signal levels of each of R, G, and B of the pixels included in the two processing region is adopted. According to the present embodiment, even when the average value is adopted in this manner, since the difference between the signal levels of each of R, G, and B of the pixels included in the two processing region is reduced by the above-described processing, it is possible to generate synthesized image data subjected to color balance processing suitable for a driver or the like.

The image synthesis unit 106 supplies the synthesized image data 303 generated in this way to the output unit 107. Then, the output unit 107 outputs the received synthesized image data 303 to the outside (display device 12) (step S19).

Next, the semiconductor device 100 determines whether to terminate the processing (step S20). If it is not determined that the processing is to be terminated (No in step S20), the semiconductor device 100 returns to the step S10 and repeats the processing. On the other hand, if it is determined that the processing is to be terminated (Yes in step S20), the semiconductor device 100 terminates the processing.

Although the first embodiment has been described above, the configuration according to the first embodiment is not limited to the configuration described above. For example, the four cameras shown in FIG. 1 may be installed in the left front portion, left rear portion, right front portion, and right rear portion of the automobile 1, Alternatively, these four cameras may be installed in the roof of the automobile 1 so that the periphery of the automobile 1 is in an imaging range. The number of cameras is not limited to four. Further, the camera may be movable, and may be configured to sequentially capture images around the automobile while moving.

According to the above-described configuration, the semiconductor device 100 or the image processing system 10 performs color balance processing suitable for images of objects around the automobile 1. As a result, the driver or the like of the automobile 1 can easily recognize the objects around the automobile 1. That is, according to the first embodiment, it is possible to provide a semiconductor device or the like for performing color balancing processing suitable for the entire image.

Modification of First Embodiment

Figure 14:
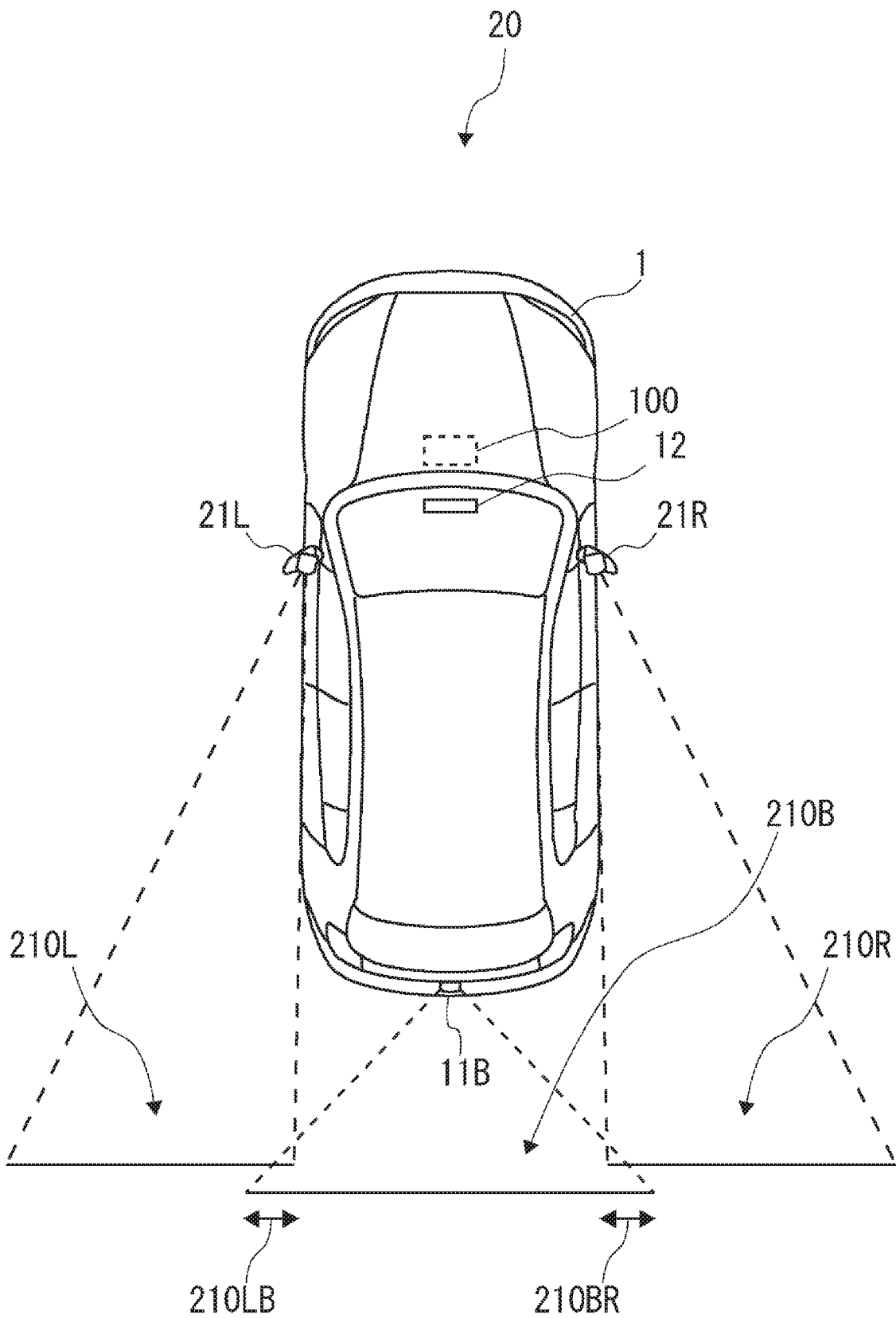
FIG. 14 is an overview of an automobile according to a modification of the first embodiment.

Next, a modification of the first embodiment will be described. FIG. 14 is an overview of an automobile according to the modification of the first embodiment. An image processing system 20 according to the modification of the first embodiment differs from the image processing system 10 according to the first embodiment in that the number of cameras and arrangement of the cameras.

The image processing system 20 according to the modification of the first embodiment is a system for capturing an image of the rear side of the automobile 1, performing predetermined processing on image data of the captured image, and displaying the processed image data to the driver or the like. The image processing system 20 may be installed in place of a side mirror and a rearview mirror of an automobile. The image processing system 20 includes a camera 21L, the camera 113, a camera 21R, the display device 12, and the semiconductor device 100 as a main configuration of the image processing system 20.

The camera 21L captures an image of an image capturing region 210L on the rear left side of the automobile 1, the camera 113 captures an image of an image capturing region 210B in the center of the rear side of the automobile 1, and the camera 21R captures an image of an image capturing region 210R on the rear right side of the automobile 1. In these image capturing regions, the image capturing regions adjacent to each other include overlapping regions which are regions where the image capturing regions overlap. That is, the image capturing region 210L and the image capturing region 210B each have an overlapping region 210LB where the image capturing region 210L and the image capturing region 210B overlap. Similarly, the image capturing region 210B and the image capturing region 210R each have an overlapping region 210BR where the image capturing region 210B and the image capturing region 210R overlap.

In such a configuration, the semiconductor device 100 generates estimation source image data by canceling effects of initial color adjustment processing by the ISPs on image data performed. Then, the semiconductor device 100 divides the estimation source image data (estimation source image) into processing regions having a plurality of pixels set in advance, performs color balance readjustment processing for each processing region, and synthesizes the image data so that the overlapping regions overlap with each other to generate a synthesized image. Further, the semiconductor device 100 outputs the readjusted synthesized image data to the display device 12.

With the above-described configuration, the driver can recognize the rear side of the automobile 1 by an image subjected to a suitable color balance processing. Therefore, the modification of the first embodiment can provide a semiconductor device or the like for performing color balance processing suitable for the entire image.

Second Embodiment

Next, a second embodiment will be described. An image processing system according to the second embodiment differs from the image processing system according to the first embodiment in a configuration of functional blocks of a semiconductor device and a procedure of processing performed by a semiconductor device. Hereinafter, referring to FIGS. 15 and 16, differences between the first embodiment and the second embodiment will be described.

Figure 15:
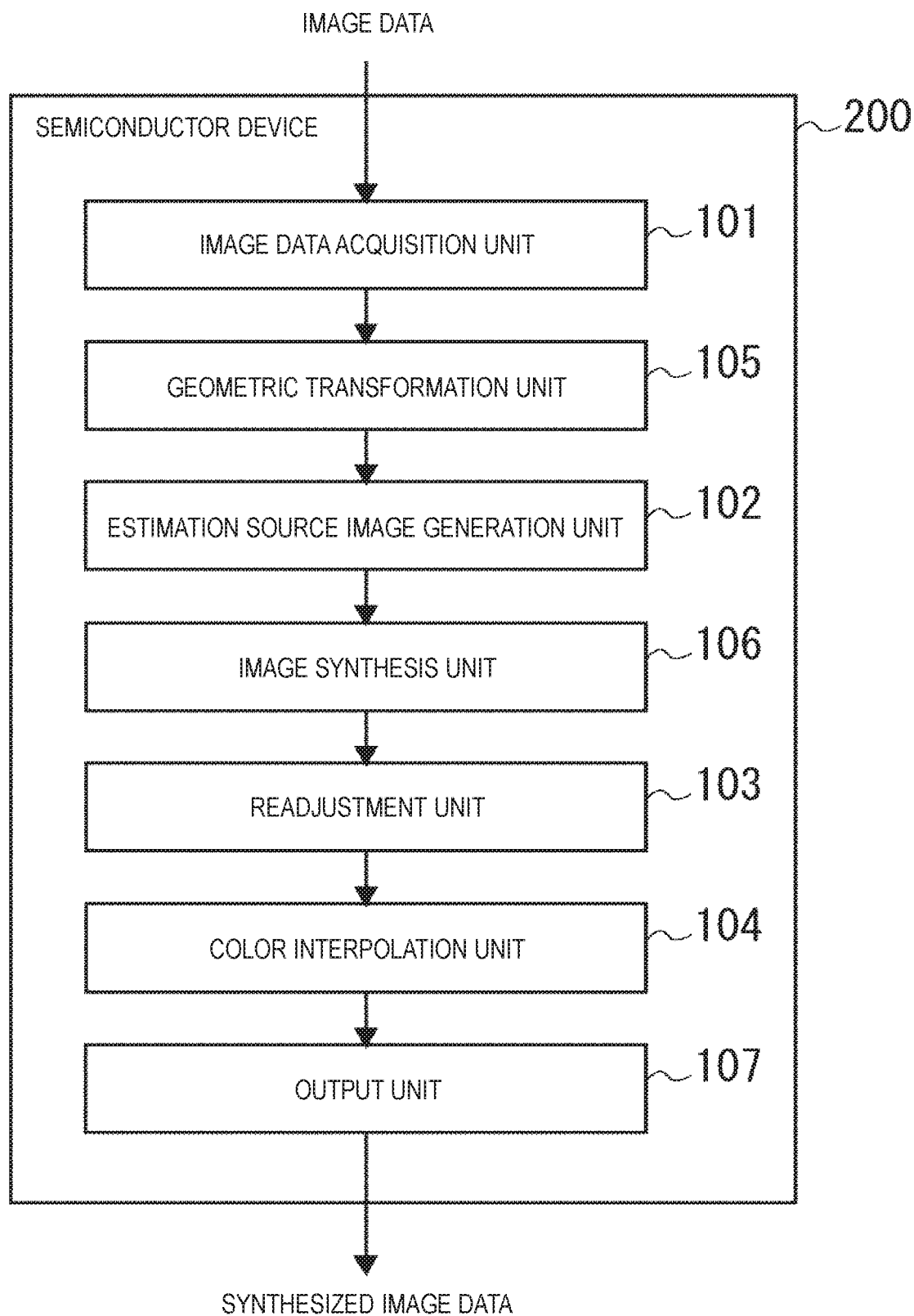
FIG. 15 is a functional block diagram of a semiconductor device according to a second embodiment.

FIG. 15 is a functional block diagram of a semiconductor device according to the second embodiment. Each functional block of a semiconductor device 200 according to the second embodiment is the same as that of the semiconductor device 100 according to the first embodiment. However, in the semiconductor device 200, the geometric transformation unit 105 is provided between the image data acquisition unit 101 and the estimation source image generation unit 102. In the semiconductor device 200, the image synthesis unit 106 is provided between the estimation source image generation unit 102 and the readjustment unit 103.

Figure 16:
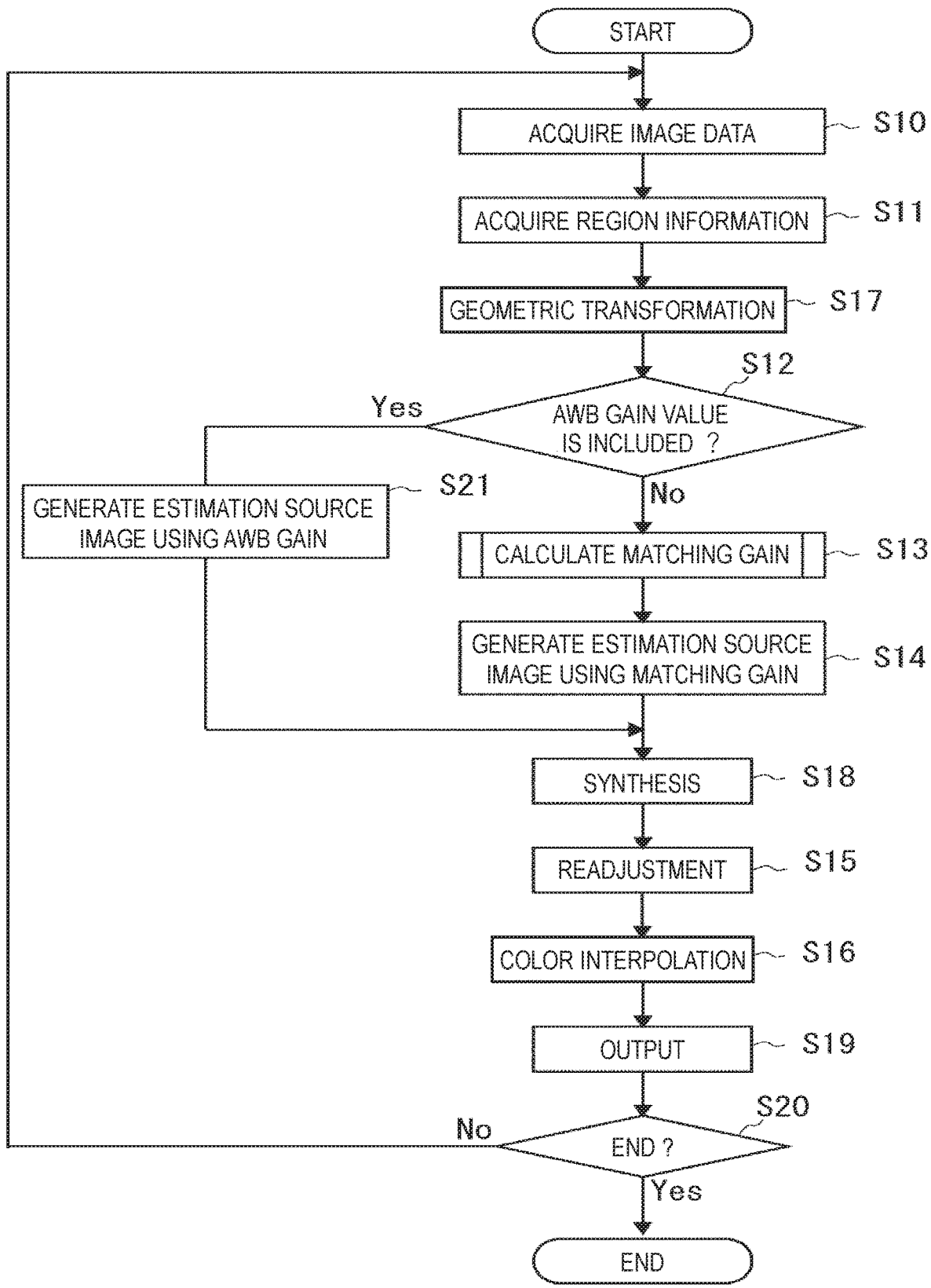
FIG. 16 is a flowchart showing processing of the semiconductor device according to the second embodiment.

FIG. 16 is a flowchart showing processing of the semiconductor device according to the second embodiment. Each processing (step) performed by the semiconductor device 200 according to the second embodiment is the same as that performed by the semiconductor device 100 according to the first embodiment. However, in the processing according to the second embodiment, the geometric transformation processing (step S17) is performed after the processing of obtaining region information (step S11), and the processing of determining whether or not there is AWB gain information (step S12) is performed after the geometric transformation processing (step S17). In the process according to the second embodiment, the processing of synthesizing images (step S18) is performed after the processing of generating estimation source images (after step S14 or step S21). The readjustment processing (step S15) is performed after the processing synthesizing images (step S18).

Although the second embodiment has been described above, the configuration of the second embodiment is not limited to this, and the procedure of the processing may be appropriately replaced according to characteristics of the semiconductor device.

According the above-described configuration, the semiconductor device 200 performs color balance processing on images suitable for objects around the automobile 1. As a result, the driver or the like of the automobile 1 can easily recognize the object around the automobile 1. That is, according to the second embodiment, it is possible to provide a semiconductor device or the like for performing color balance processing suitable for the entire image.

Also, the programs described above may be stored and provided to a computer using various types of non-transitory computer readable media. Non-transitory computer readable media includes various types of tangible storage media. Examples of non-transitory computer readable media include magnetic recording media (e.g., flexible disks, magnetic tapes, hard disk drives), magneto-optical recording media (e.g., magneto-optical disks), a Compact Disc Read Only Memory (CD-ROM), a Compact Disc Recordable (CD-R), a Compact Disc Rewritable (CD-R/W), and a semiconductor memory (e.g., masked Read Only Memory (ROM), Programmable ROM (PROM), Erasable PROM (EPROM), flash ROM, Random Access Memory (RAM)). In addition, the program may also be supplied to a computer by various types of transitory computer readable media. Examples of transitory computer readable media include electrical signals, optical signals, and electromagnetic waves. The transitory computer readable medium may provide the program to a computer via wired communication paths such as electrical wires and optical fibers, or wireless communication paths.

Although the invention made by the present inventors has been specifically described based on the embodiments, it is needless to say that the present invention is not limited to the above-described embodiments, and various changes may be made without departing from the scope thereof.

What is claimed is:

1. A semiconductor device comprising:
   an image acquisition circuit configured to acquire a plurality of captured image data obtained by capturing a plurality of images, each captured image data being image data on which initial color adjustment processing has been performed, each image including an overlapping region in an image capturing region of the own image, the overlapping region being a region where the image capturing regions of the images overlap each other;
   an estimation source image generation circuit configured to cancel effects of the initial color adjustment processing on each captured image data to generate image data of a plurality of estimation source images;

a readjustment circuit configured to divide each estimation source image into a plurality of processing regions to perform color balance readjustment processing for each processing region; and an image synthesis circuit configured to synthesize the image data of the plurality of estimation source images so that the overlapping regions included in the estimation source images overlap each other to generate image data of a synthesized image.

2. The semiconductor device according to claim 1, wherein the readjustment circuit is configured to divide each estimation source image so as to include one or more processing regions in the overlapping region.

3. The semiconductor device according to claim 1, further comprising an output circuit configured to output the image data of the synthesized image.

4. The semiconductor device according to claim 1,
wherein the image of each captured image data is divided into a plurality of processing region according to the plurality of processing regions of the corresponding estimation source image;
wherein the estimation source image generation circuit is configured to calculate, for each captured image data, a matching gain for matching signal levels of pixels in the processing region having a correspondence relationship with each other in the overlapping region of the image of the captured image data, and generate the estimation source image of the image data by multiplying the matching gain by signal levels of pixels included in the corresponding captured image data.

5. The semiconductor device according to claim 4, wherein the estimation source image generation circuit is configured to calculate the matching gain based on an average value of the signal levels of the pixels in the processing region having the correspondence relationship.

6. The semiconductor device according to claim 1, wherein the estimation source image generation circuit is configured to generate, based on information on the initial color adjustment processing included in each captured image data, the image data of the corresponding estimation source image.

7. The semiconductor device according to claim 4, wherein the estimation source image generation circuit is configured to generate, by multiplying an inverse number of information the initial color adjustment processing included in each captured image data by the signal levels of the pixels in the corresponding captured image data, the image data of the corresponding estimation source image.

8. The semiconductor device according to claim 1, wherein the readjustment circuit is configured to extract pixels which have a preset color and preset signal levels in the processing region as reference pixels, calculate a readjustment gain based on the reference pixels, and perform the color balance readjustment processing for the processing region from which the reference pixels are extracted based on the readjustment gain.

9. The semiconductor device according to claim 8, wherein, when there are not pixels which have a preset color and preset signal levels in the processing region adjacent to the processing region from which the reference pixel are extracted, the readjustment circuit is configured to set the readjustment gain calculated based on the reference pixels as an adjacent gain, and perform the color balance readjustment processing for the processing region adjacent to the processing region from which the reference pixels are extracted based on the adjacent gain.

10. The semiconductor device according to claim 9, wherein, when there is a plurality of adjacent gains, the readjustment circuit is configured to calculate an average value of the plurality of adjacent gains, and perform the color balance readjustment processing for the processing region adjacent to the processing region from which the reference pixels are extracted based on the average value.

11. The semiconductor device according to claim 1, wherein the processing region is a region obtained by dividing each estimation source image into lattice-shaped regions.

12. The semiconductor device according to claim 1, wherein the image synthesis circuit is configured to synthesize the image data of the plurality of estimation source images on which the color balance readjustment processing has been performed by the readjustment circuit.

13. The semiconductor device according to claim 1,
wherein the image synthesis circuit is configured to synthesize the image data of the plurality of estimation source images before the color balance readjustment processing is performed by the readjustment circuit, and
wherein the readjustment circuit is configured to divide the estimation source images included in the synthesized image into the plurality of processing region data, and perform the color balance readjustment processing on each processing region data.

14. An image processing system comprising:
the semiconductor device according to claim 1;
a plurality of cameras configured to output the plurality of captured image data; and
a display device configured to receive the image data of the synthesized image.

15. The image processing system according to claim 14,
wherein each camera comprises an image signal processor, and
wherein the image signal processor is configured to perform the initial color adjustment processing on the captured image data.

16. The image processing system according to claim 14,
wherein the plurality of cameras is configured to capture images of scenery around a moving object to generate the plurality of captured image data, and
wherein the synthesized image is a two-dimensional image of a 360-degree scenery around the moving object.

17. A semiconductor device for synthesizing first and second captured image data each including captured image data of an overlapping region, the first captured image data being data obtained by capturing an image of a first image capturing region, the second captured image data being data obtained by capturing an image of a second image capturing region, the overlapping region being a region where the first and second image capturing regions overlap each other, the semiconductor comprising:

an image data acquisition circuit configured to acquire the first and second captured image data on which initial color adjustment processing has been performed;

an estimation source image generation circuit configured to cancel effects of the initial color adjustment processing performed on the first captured image data and the second captured image data to generate image data of a first estimation source image and image data of a second estimation source image;

a readjustment circuit configured to divide each of the first estimation source image and the second estimation source image into a plurality of processing region, and perform color balance readjustment processing on each of the image data of the first estimation source image and the image data of the second estimation source image for each processing region; and an image synthesis circuit configured to synthesize the image data of the first estimation source image and the image data of the second estimation source image so that a region associated with the overlapping region included in the first estimation source image and a region associated with the overlapping region included in the second estimation source image overlap each other to generate image data of a synthesized image.

18. An image processing system comprising:

the semiconductor device according to claim 17;

a first camera configured to output the first captured image data;

a second camera configured to output the second captured image data; and a display device configured to receive the image data of the synthesized image, wherein the first camera comprises a first image signal processor configured to perform the initial color adjustment processing on the first captured image data, and wherein the second camera comprises a second image signal processor configured to perform the initial color adjustment processing on the captured second image data.

19. An image processing method comprising:

acquiring a plurality of captured image data obtained by capturing a plurality of images, each captured image data being image data on which initial color adjustment processing has been performed, each image including an overlapping region in an image capturing region of the own image, the overlapping region being a region where the image capturing regions of the images overlap each other;

canceling effects of the initial color adjustment processing on each captured image data to generate image data of a plurality of estimation source images;

dividing each estimation source image into a plurality of processing region to perform color balance readjustment processing for each processing region; and synthesizing the image data of the plurality of estimation source images so that the overlapping regions included in the estimation source images overlap each other to generate image data of a synthesized image.

20. A non-transitory computer readable storage medium which stores a program for causing a computer to perform a method comprising acquiring a plurality of captured image data obtained by capturing a plurality of images, each captured image data being image data on which initial color adjustment processing has been performed, each image including an overlapping region in an image capturing region of the own image, the overlapping region being a region where the image capturing regions of the images overlap each other;

canceling effects of the initial color adjustment processing on each captured image data to generate image data of a plurality of estimation source images;

dividing each estimation source image into a plurality of processing region to perform color balance readjustment processing for each processing region; and synthesizing the image data of the plurality of estimation source images so that the overlapping regions included in the estimation source images overlap each other to generate image data of a synthesized image.

* * * * *